US008125687B2

(12) United States Patent
Tin

(10) Patent No.: US 8,125,687 B2
(45) Date of Patent: Feb. 28, 2012

(54) TARGET FOR COLOR CHARACTERIZATION OF COLOR PRINTER

(75) Inventor: Siu-Kei Tin, Milpitas, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 751 days.

(21) Appl. No.: 12/285,438

(22) Filed: Oct. 6, 2008

(65) Prior Publication Data

US 2010/0085586 A1 Apr. 8, 2010

(51) Int. Cl.
H04N 1/60 (2006.01)
H04N 1/034 (2006.01)
G03F 3/08 (2006.01)
G06K 9/00 (2006.01)
B41J 29/393 (2006.01)

(52) U.S. Cl. ............. 358/1.9; 358/529; 382/165; 347/3; 347/19

(58) Field of Classification Search ................... 358/1.9, 358/501, 3.23, 2.1, 3.27, 1.12, 529, 504; 382/162, 164, 165, 166; 347/19, 3, 2, 15, 347/115, 172
See application file for complete search history.

(56) References Cited

U.S. PATENT DOCUMENTS

| 5,363,318 | A | 11/1994 | McCauley |
|---|---|---|---|
| 6,443,556 | B1 * | 9/2002 | Garcia et al. ................... 347/43 |
| RE38,180 | E * | 7/2003 | Edge ................ 347/19 |
| 6,585,340 | B1 * | 7/2003 | Borrell ............. 347/14 |
| 6,654,143 | B1 * | 11/2003 | Dalal et al. .................... 358/1.9 |
| 6,697,520 | B1 | 2/2004 | Hemingway |
| 6,698,860 | B2 | 3/2004 | Berns et al. |
| 6,705,703 | B2 | 3/2004 | Zeng et al. |
| 6,775,029 | B1 | 8/2004 | Wen et al. |
| 6,832,824 | B1 * | 12/2004 | Baker et al. ................... 347/19 |
| 7,019,868 | B2 | 3/2006 | Chang et al. |
| 7,027,182 | B1 * | 4/2006 | Soler ............................ 358/1.9 |
| 7,027,185 | B2 * | 4/2006 | Subirada et al. ............... 358/1.9 |

(Continued)

FOREIGN PATENT DOCUMENTS

WO WO 93/20648 10/1993

OTHER PUBLICATIONS

A. Ufuk Agar, et al., An Iterative YNSN Method for Color Printer Characterization, The Sixth Color Imaging Conference: Color Science, Systems, and Applications, 1998, pp. 197-200.

(Continued)

*Primary Examiner* — Madelein A Nguyen
(74) *Attorney, Agent, or Firm* — Fitzpatrick, Cella, Harper & Scinto

(57) ABSTRACT

With respect to color characterization of color printers, the present disclosure relates to the identification of colorant combinations for color patches in a color characterization target, which contains different color patches, and which is measured calorimetrically or spectrally to color-characterize the printer. A black ramp is printed and measured. Substantially uniform steps on the ramp are selected by applying principal component analysis to the measured values or color values derived from the measured values, and by using a first principal component thereof to select the substantially uniform steps. For each of the substantially uniform steps identified, the above procedure is repeated on all chromatic ramps with black ink at a corresponding black level. Color values of the color patches are populated by using multiple combinations of the substantially uniform steps of the black channel and of the chromatic channels at the corresponding black levels that meet an ink limit.

21 Claims, 19 Drawing Sheets
(1 of 19 Drawing Sheet(s) Filed in Color)

U.S. PATENT DOCUMENTS

| | | | |
|---|---|---|---|
| 7,057,765 | B1 | 6/2006 | Fischer et al. |
| 7,064,860 | B1 | 6/2006 | Balasubramanian et al. |
| 7,103,216 | B2 | 9/2006 | Okamoto |
| 7,209,145 | B2 | 4/2007 | Stevens |
| 7,265,870 | B2 | 9/2007 | Velde et al. |
| 2003/0063275 | A1* | 4/2003 | Hubble et al. ............... 356/319 |
| 2003/0072016 | A1* | 4/2003 | Dalrymple et al. ............ 358/1.9 |
| 2005/0030559 | A1* | 2/2005 | Jacob ........................... 358/1.9 |
| 2005/0195415 | A1* | 9/2005 | De Baer ........................ 358/1.9 |
| 2006/0082843 | A1 | 4/2006 | Li et al. |
| 2006/0268296 | A1* | 11/2006 | McElvain ...................... 358/1.9 |
| 2009/0310154 | A1* | 12/2009 | Morovic et al. ............... 358/1.9 |
| 2010/0054595 | A1* | 3/2010 | Demandolx et al. .......... 382/170 |

OTHER PUBLICATIONS

Raja Balasubramanian, Optimization of the Spectral Neugebauer Model for Printer Characterization, Journal of Electronic Imaging, Apr. 1999, vol. 8, pp. 156-166.

Benham Bastani, et al., Sparse Cellular Neugebauer Model for N-ink Printers, Society for Imaging Science and Technology, 14th Color Imaging Conference Final Program and Proceedings, 2006, pp. 220-223.

Yongda Chen, et al., Six Color Printer Characterization Using an Optimized Cellular Yule-Nielsen Spectral Neugebauer Model, Journal of Imaging Science and Technology, 2004, vol. 48, No. 6, pp. 519-528.

Robert Rolleston, et al., Accuracy of Various Types of Neugebauer Model, IS&T and SID's Color Imaging Conference: Transforms & Transportability of Color, 1993, pp. 32-37.

Lawrence A. Taplin, et al., Spectral Color Reproduction Based on a Six-Color Inkjet Output System, IS&T/SID Ninth Color Imaging Conference, pp. 209-213.

David R. Wyble, et al., A Critical Review of Spectral Models Applied to Binary Color Printing, Color. Research and Application, 2000, vol. 25, No. 1, pp. 4-19.

Mike Stokes, et al., Precision Requirements for Digital Color Reproduction, ACM Transactions on Graphics, 1992, vol. 11, No. 4, pp. 406-422.

Marshall Bern, et al., Optimized Color Gamuts for Tiled Displays, ACM, 2003, pp. 274-281.

* cited by examiner

TARGET FOR COLOR CHARACTERIZATION OF COLOR PRINTER

BACKGROUND

1. Field

The present disclosure relates to a color characterization of color printers. More precisely, the present disclosure relates to the identification and selection of colorant combinations for color patches in a color characterization target, which is printed by a printer and which contains multiple different color patches, and which is measured colorimetrically or spectrally so as to color-characterize the printer.

2. Description of the Related Art

Known techniques for color-characterization of a color printer typically involve the printout by the printer of a color characterization target which contains multiple differently colored patches. The color patches are measured calorimetrically or spectrally. Based on a mapping between the colorant values that created each color patch, and the spectral or colorimetric measurement of each such color patch, the color performance of the printer can be derived and characterized.

Recently, two technological and marketplace developments have converged that tend to increase the burden involved in characterization of a color printer. First, more printers are being encountered that include a large number of colorant channels, such as CMYKRG color printers which include six color channels (i.e., cyan, magenta, yellow, black, red and green colorant channels). The number of color patches that must be printed increases geometrically with the number of colorant channels, for the reason that color characterization yields better results when the colors of the color patches fill the color space of the color printer. In addition, each color patch must be measured calorimetrically or spectrally. The complexity of the mapping between colorant values and color measurements also increases with an increased number of color patches. As a result, with four or more colorant channels, the burden of printing multiple patches, measuring them, and mapping them, also increases geometrically.

Second, there has been a trend toward spectral measurements and spectral characterization of color printers, as opposed to colorimetric measurements and colorimetric characterization. A colorimetric measurement of a color patch ordinarily yields a three-dimensional value such as a trichromatic XYZ value in CIEXYZ space or an $L^*a^*b^*$ value in CIELAB space. Spectral color measurements typically have far higher dimensionality. For example, a spectral measurement may include 31 measurements, each corresponding to a different measurement of the color patch's spectral reflectance at each 10 nm interval in the visible light range of 400 to 700 nm. The amount of data increases significantly with spectral measurements compared to colorimetric measurements. In addition, the complexity of the mapping between the colorant values and the spectral measurements is also increased significantly.

SUMMARY

In keeping with the above concerns, one aspect of the present invention involves a rational selection of colorant values for the color patches of a color characterization target, wherein the selection is made so as to result in a practicable number of color patches that tend to fill the printer color space, so as to yield good color characterization of the printer.

According to another aspect, colorant values are determined for color patches in a printable target that contains plural such color patches, wherein the printable target is printable by a color printer having multiple colorant channels including a black channel, and is thereafter usable for color characterization of the color printer. A multi-step process is used to determine colorant values for the color patches in the printable target. A black ramp is printed using the black channel. Color values of the black ramp are measured to obtain measured values thereof. Substantially uniform steps on the black ramp as determined in a printer independent color space are selected by applying principal component analysis (PCA) to the measured color values or color values derived from the measured color values of the black ramp, and by using a first principal component thereof to select the substantially uniform steps. In addition, the substantially uniform steps are substantially invariant to small variations in the first principal component of the black ramp. For multiple ones of the substantially uniform steps of the black channel, the following steps are performed: (a) a chromatic ramp is printed for each of the multiple non-black colorant channels along with black ink at a corresponding black level; (b) color values of the chromatic ramps are measured to obtain measured values thereof; and (c) substantially uniform steps on each of the chromatic ramps as determined in a printer independent color space are selected by applying principal component analysis (PCA) to the measured color values or color values derived from the measured color values of each such chromatic ramp, and by using a first principal component thereof to select the substantially uniform steps. In addition, the substantially uniform steps of each such chromatic ramp are substantially invariant to small variations in the first principal component of each such chromatic ramp. Moreover, there are a relatively greater number of substantially uniform steps for each such chromatic ramp at smaller values of the black level, and a relatively smaller number of substantially uniform steps for each such chromatic ramp at larger values of the black level. Colorant values of the color patches are populated in the printable target by using multiple combinations of the substantially uniform steps of the black channel and of the chromatic channels at the corresponding black levels that meet an ink limiting threshold.

By virtue of the foregoing, it is ordinarily possible to obtain a printable target containing plural color patches in which there are a practicable number of color patches which tend to fill the color space of the color printer, so as to obtain good color characterization for the color printer regardless of whether colorimetric or spectral measurements are used. As one example, in a six-colorant CMYRG printer, with a modest five steps in each ink, a conventional color target might have included $5^6=15,625$ color samples. Such a large number of color patches would be impractical to print and to measure, especially for a spectral characterization. Moreover, even if all 15,625 patches were printed and measured, the resulting data set might be too computationally intensive to yield a good color characterization. According to one example embodiment, however, it is possible to reduce the number of color patches down to around 3,650 to 4,040 color patches, even with practical ink limits of between 200% to 250%, and still yield good spectral or colorimetric characterization of the printer.

According to one aspect, with respect to the application of principal component analysis (PCA) to the measured color values, there is an advantageous effect in that PCA analysis will yield a first principal component which provides a measure of separation in each colorant channel through automatic data analysis, without the need to know the actual color of the colorant channel. In addition, because PCA is an orthogonal transformation, PCA tends to preserve distances in color space, whether it is in the format of calorimetric, perceptual or spectral.

In another aspect, with respect to the selection of substantially uniform steps that are substantially invariant to small variations in a first principal component, there is an advantageous effect in which the chosen steps tend to remain constant even across different measurements of a particular printer. More precisely, an ordinary approach to determination of steps for each colorant channel is to determine steps in the colorant channel that are precisely equal to each other when measured in some predetermined color space which may be calorimetric, perceptual or spectral. Such an approach would result in different steps in the colorant channels for each different run of measurements of the same printer, since the determination of steps would then depend sensitively on the linearization curves. Different runs of measurements would therefore likely generate slightly different steps in the colorant channels. While such differences might not be significant to ensuing colorimetric or perceptual uniformity, such differences can often cause difficulties to color scientists and printer R&D engineers, who are trying to compare one run against another. For color scientists and printer R&D engineers, therefore, an advantageous effect of identifying substantially uniform steps, as opposed to strictly uniform steps, is that the steps in the colorant channel tend to be identical from one run of a color target generation to another run of a different target generation, allowing more direct comparisons of multiple runs.

In another aspect, with respect to the non-black ink combinations at different black levels, there is an advantageous effect by including a relatively greater number of substantially uniform steps for each chromatic ramp at smaller values of the black level, and having a relatively smaller number of substantially uniform steps for each chromatic ramp at larger values of the black level. More precisely, an advantageous effect is obtained in which colorant combinations tend to be excluded, hence reducing the number of color patches in the target, for high values of the black channel. Furthermore, this tends to exclude very dark color patches, whose measurements tend to be noisy and thus detrimentally affect mapping anyway. At the same time, because of this adjustment, although color patches are excluded, the resulting printable target tends to have colors that are more evenly spaced in a device independent color space such as a CIELAB color space.

In addition to the foregoing, some example embodiments do not necessarily simply discard colorant values that fail to meet the ink limiting threshold. Instead, for colorant values that do not meet the ink limiting threshold, the possibility of a replacement colorant value for the discarded colorant combination is considered. More precisely, a cellular dot area model for each of every printed and measured ramp is defined, which maps arbitrary colorant values of each ramp to corresponding dot areas of such colorant values. Replacement colorant values are determined for at least some of those combinations of substantially uniform steps of the black channel and of the chromatic channels at the corresponding black levels that do not meet the ink limiting threshold. The replacement value is determined by using an inverse of the cellular dot area model, and the replacement value is populated into the color patches in the printable target.

As a result, with respect to determining replacement colorant values, there is an advantageous effect obtained by replacing the colorant values for at least some of the multiple combinations of the substantially uniform steps of the black channel and of the chromatic channels at the corresponding black levels that do not meet the ink limiting threshold. More precisely, an ordinary approach to selection of color patches for color characterization is to discard all colors that do not meet the ink limiting threshold. The advantageous effect is obtained here by including more color patches to populate the LUT and therefore creating a more accurate characterization of the color printer.

Replacement colorant values for colorant values that do not meet the ink limiting threshold may be calculated by determining a colorant combination formed by reducing each non-black ink to the previous step of the substantially uniform steps of the chromatic ramp, while maintaining the black ink at the same black level. It is then verified if the resulting colorant combination satisfies the ink limiting threshold. If the verification fails, no replacement color values will be included. If the verification succeeds, meaning that the reduced colorant combination satisfies the ink limiting threshold, then a path in a dot area space is constructed that connects a dot area combination corresponding to the colorant combination with reduced ink to a dot area combination corresponding to the original colorant combination. This path can, for example, be a straight line. Next, a dot area combination on the path that has maximum total ink and meets the ink limiting threshold is determined. This corresponds to the intersection of the path with the ink limit boundary. Finally, the replacement colorant values are obtained by converting the dot area combination to colorant combination using an inverse of the cellular dot area model.

In another aspect, no more than one replacement value is determined for each combination of the substantially uniform steps that does not meet the ink limiting threshold.

According to another aspect, a cellular dot area model for each of every printed and measured ramp is constructed by applying a Yule-Nielsen model to each interval (cell) between the substantially uniform steps of the ramp.

According to this aspect, the definition of a cellular dot area model by applying a Yule-Nielsen model to each cell between the substantially uniform steps on a ramp provides an advantageous effect in which the dot area model provides better prediction than those created under the traditional approach. More precisely, a more traditional approach to defining a dot area model might be the application of a Yule-Nielsen model to the whole ramp, using only the minimum and the maximum values of the ramp. Such models can provide a coarse prediction of dot area corresponding to a colorant value. Applying the Yule-Nielsen model to each cell between the substantially uniform steps on a ramp, and by using the values from each step, allows the model to make use of a larger set of measurements and therefore, improves the overall accuracy of the model.

In another aspect, the process of printing, measuring and selecting substantially uniform steps on each of the chromatic ramps for multiple ones of the substantially uniform steps of the black channel is performed for all of the substantially uniform steps of the black channel except the one that corresponds to a full black value.

According to another aspect, M measurements are designated for the black ramp and for each chromatic ramp. The designation of M should preferably be large enough to capture the non-linear response in the ramp. PCA is applied to the M measurements or quantities derived from the measurements of the black ramp and each chromatic ramp to obtain first component values thereof. The first component values of the black ramp and each chromatic ramp are normalized to take values between zero and one. A number m of substantially uniform steps is designated, where m is less than M. A value for an i-th step from the M measurements is selected, which has a corresponding normalized first component value closest to the value of i divided by (m−1).

According to another aspect, a color printer having multiple colorant channels including a black channel is characterized using a set of dot area curves, one for each colorant channel, and a multi-dimensional LUT with a same number of input dot area channels as the number of colorant channels. A printable target containing plural color patches is printed by the color printer. Each of those color patches has colorant values corresponding to the multiple colorant channels of the printer. The colorant values of the color patches in the printable target are determined by the method described above with regards to determining color patches in a printable target that contains plural color patches. The same method also determines the dot area curves for the colorant channels. The printed color patches are measured to obtain a measured value for each color patch. The colorant values for the printed color patches are converted to colorant dot areas using the dot area curves. A LUT that relates the colorant dot areas to the colorimetric or spectral values is populated, wherein each LUT entry maps a colorimetric or spectral value to a corresponding set of values for colorant dot areas at vertices of the LUT grid. The colorimetric or spectral values are obtained by either using the measured values of color patches at a LUT vertex, if the ink limiting threshold is met, or by a method of extrapolation using the measured values of color patches in the vicinity of a LUT vertex including the color patch corresponding to the replacement colorant value, if the ink limit threshold is not met.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1A:
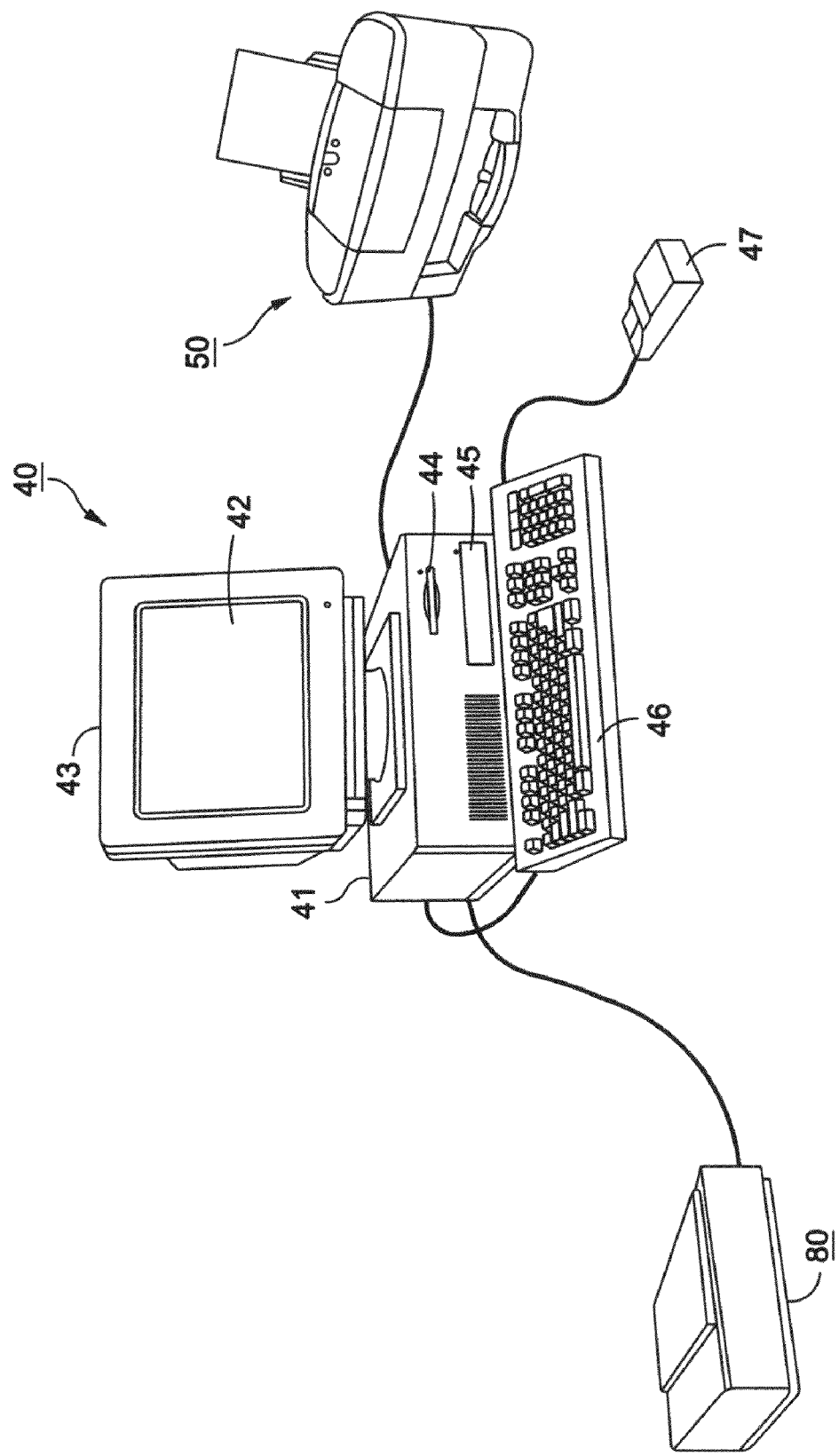
FIG. 1(a) is a representative view of a computing environment in which an exemplary embodiment of the present invention may be implemented.

FIG. 1(a) shows the external appearance of a representative computing system including a data processing system 40, peripherals and digital devices which may be used in connection with the practice of an exemplary embodiment of the present invention. The data processing system 40 includes host processor 41 which comprises a personal computer (hereinafter "PC"), preferably a personal computer which has a windows-based operating system, although the data processing system 40 may be another type of computer which has a non-windows-based operating system. Provided with the data processing system 40 are a color monitor 43 including a display screen 42, a keyboard 46 for entering text data and user commands, and a pointing device 47. The pointing device 47 preferably comprises a mouse for pointing and for manipulating objects displayed on the display screen 42.

The data processing system 40 includes a computer-readable memory medium such as computer fixed disk 45 and/or floppy disk drive 44. Floppy disk drive 44 enables the data processing system 40 to access information, such as computer-executable process steps, computer-executable application programs, etc. stored on removable media. A similar CD-ROM interface (not shown) may be provided for the data processing system 40 through which the data processing system 40 can access information stored on removable CD-ROM media.

Printer 50 is a printer, such as a color bubble jet printer, which forms color images on a recording medium such as paper or transparencies or the like. Printer 50 is a halftone printer having a number of different inks, such as four, but may also have more than four inks such as six or more. Data processing system 40 may acquire digital image data from sources such as a digital camera (not shown), a server on a local area network (not shown), or the Internet via a network interface (not shown). Device 80 may also be provided which may be a spectrophotometer or colorimeter so as to measure the spectral reflectance or colorimetric values of a color sample, such as a printout of printer 50, and to send the spectral or calorimetric data to data processing system 40.

Figure 1B:
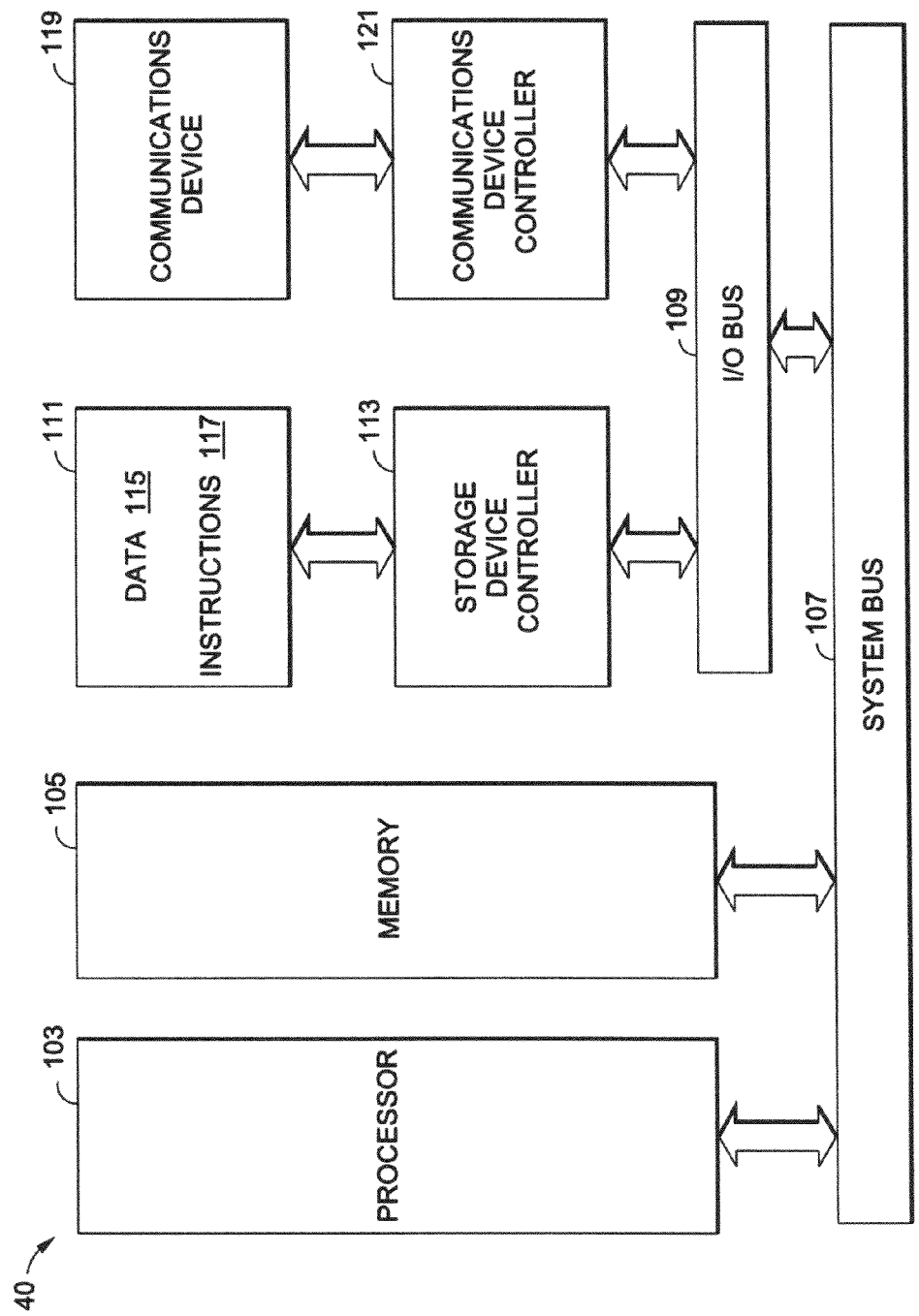
FIG. 1(b) is a detailed block diagram for explaining the internal architecture of the computer equipment shown in the computing environment of FIG. 1(a).

FIG. 1(*b*) is an architecture diagram of an exemplary data processing system 40. Data processing system 40 includes a processor 103 coupled to a memory 105 via system bus 107. The processor is also coupled to external Input/Output (I/O) devices (not shown) via the system bus 107 and an I/O bus 109. A storage device 111 having a computer-readable medium is coupled to the processor 103 via a storage device controller 113 and the I/O bus 109 and the system bus 107. The storage device 111 is used by the processor 103 and controller 113 to store and read/write data 115 and program instructions 117 used to implement any of the methods or processes described below.

Program instructions 117 include, for example, a color management module, a printer driver, code for running algorithms discussed below with regards to FIGS. 4, 7, 14 and 18, code for running computational architecture discussed below with regard to FIG. 12, other device drivers, and other application programs. Data 115 includes, for example, device profiles used by the color management module and/or printer driver, a forward model LUT, an inverse model LUT, and stored values of the spectral or calorimetric data measured, for example, by device 80.

The processor 103 may be further coupled to a communications device 119 via a communications device controller 121 coupled to the I/O bus 109. The processor 103 uses the communications device 119 to communicate with a network (not shown). The processor may also use the communication device to communicate with another device for transferring a profile, model, and/or image.

In operation, the processor 103 loads the program instructions 117 from the storage device 111 into the memory 105. The processor 103 then executes the loaded program instructions 117 to perform any of the methods described below. Thus, processor 103 operates under the control of the instructions 117 to perform the methods of exemplary embodiments of the present invention, as described in more detail below with regards to FIGS. 4, 7, 12, 14 and 18.

Figure 2:
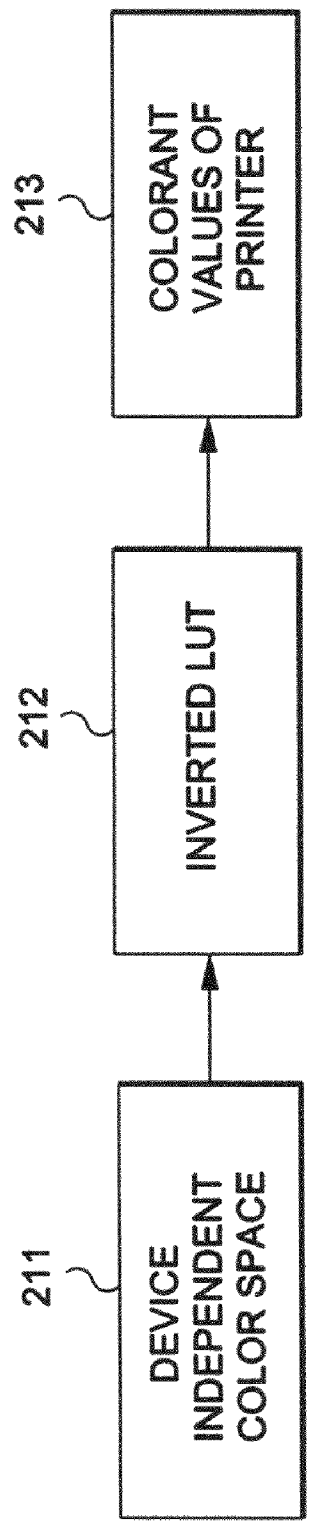
FIG. 2 is an architectural view of the software for a device driver.

FIG. 2 is an architectural view of the color management aspect of the software for a device driver, such as a printer driver, which is an exemplary embodiment. The device driver is stored as one of the sets of program instructions on the storage device 111 of FIG. 1(*b*). The processor 103 loads the device driver program instructions from the storage device 111 into the memory 105 and then executes the loaded device driver program instructions to perform a transformation from color values in a device independent color space, such as CIEXYZ, to colorant values of a multi-ink printer using an inverse model. In particular, the device driver includes an inverted LUT 212, wherein a forward model LUT is populated with values using the methods of the exemplary embodiments described below and then inverted to be used by the printer driver. The inverted LUT 212 models a transformation from color values in a device independent color space 211 to colorant values 213 of a multi-ink printer, such as printer 50.

Another example embodiment which is used to color characterize a multi-ink printer, and more specifically to construct a (forward) spectral model LUT for a halftone printer with N inks, will now be described. In order to help explain the example embodiment, currently known methods for modeling halftone printers will first be discussed. One popular technique for modeling a halftone printer is the Cellular Neugebauer model and variants thereof. In particular, Cellular Neugebauer models are used to build a (forward) spectral model for a halftone printer with N inks, where N≧3. More specifically, in the context of spectral printer modeling, a well-known choice is the Cellular Yule-Nielsen modified Spectral Neugebauer model (CYNSN).

The CYNSN model may be seen to consist of two steps. The first step consists of using a series of N "dot area curves" to transform printer device values to dot areas. The second step involves using an N-dimensional LUT to transform the dot areas to "modified spectral reflectances", which will be described in more detail below. In other words, LUT interpolation is performed in a "modified spectral space", and an inverse modifying transformation is applied to the interpolated value to obtain the spectral reflectance.

The dot area curves as described above may be obtained by fitting a dot gain model, such as a Yule-Nielson model, to measurements of primary ramps. Namely, N ramps consisting of a sufficient number of steps are printed for each ink in the printer. For each printed ramp, the spectral reflectance measurement of a step is then fitted to the equation:

$$R_\lambda^{1/n} = aR_{\lambda,1}^{1/n} + (1-a)R_{\lambda,0}^{1/n}$$

for every sampling wavelength λ. For example, if the spectral measurement uses 31 bands, then there will be 31 equations to fit. In the above equation, $R_\lambda$ is the reflectance of the step at λ predicted by the model, $R_{\lambda,1}$ is the (measured) reflectance at 100% ink coverage, $R_{\lambda,0}$ is the (measured) reflectance of the substrate, i.e., at 0% ink coverage, n is the Yule-Nielsen n-factor, and a is the (effective) dot area. To determine the dot area curve of an ink, the dot area of each step in the ramp of which a device value is known is determined. The dot area a is typically obtained statistically by fitting the above equations to the measurement data, however an extra complication exists because the n-factor is also unknown. Thus, the procedure commonly used is to first assume a value for n, then fit every step to the Yule-Nielson equation over all sampling wavelengths such that a chosen color difference metric is minimized. By using this procedure, a dot area value for every step in every ramp is determined as a function of n. n is then varied to change the dot area, and another minimization is carried out to find the optimal n which minimizes the total color difference over all steps in all ramps. The final dot areas will then correspond to the optimal n.

Figure 3:
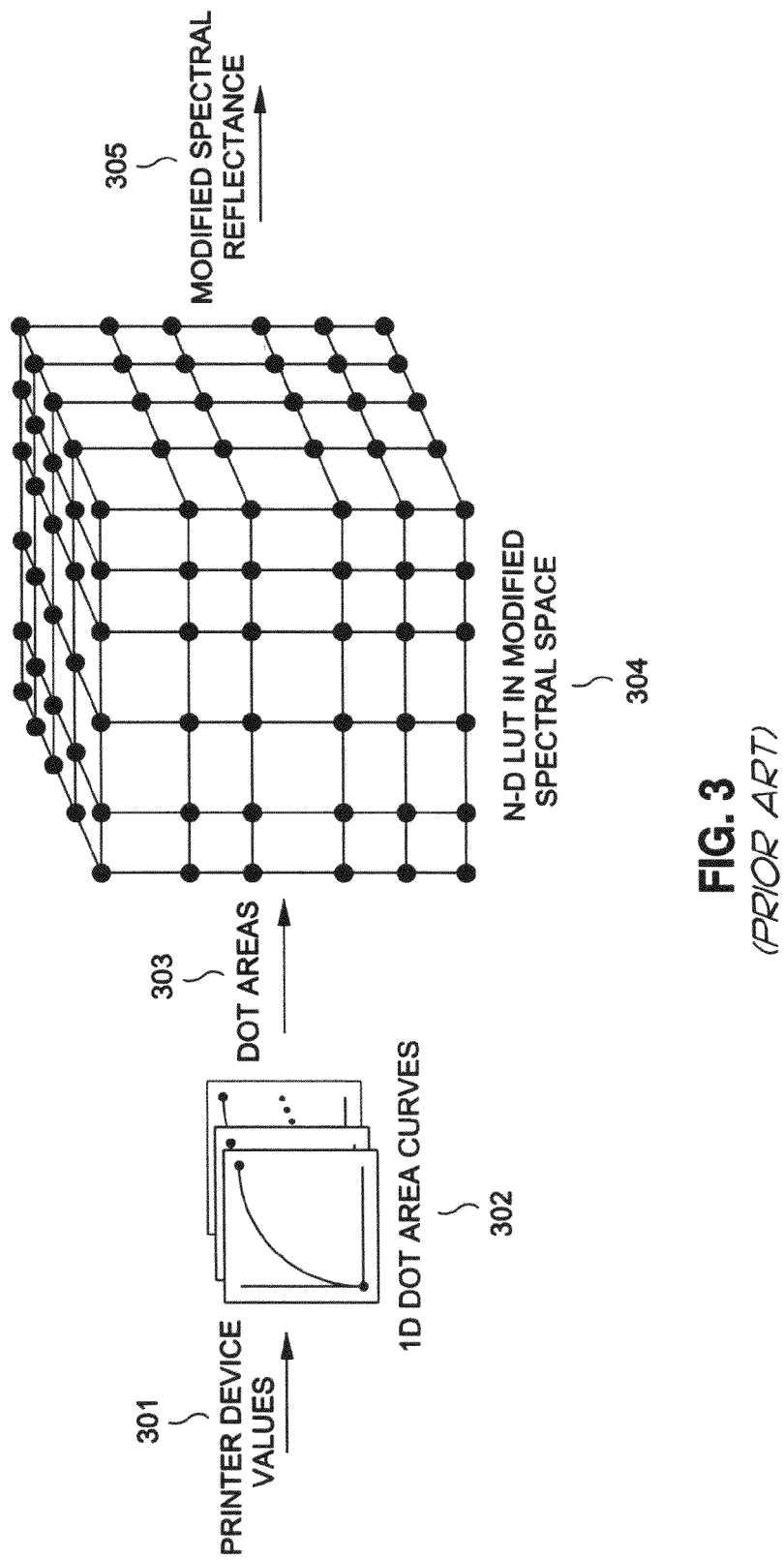
FIG. 3 is a view for providing an explanation of the computational architecture of a Cellular Yule-Nielson modified Spectral Neugebauer model (CYNSN) for modeling a halftone printer.

The Yule-Nielson model described above only deals with one ink, and does not deal with the interaction between multiple different inks. For this scenario, the Neugebauer model, or N-dimensional LUT, is implemented as shown in FIG. 3. According to the CYNSN model, after converting the device values, for example printer device values 301, to dot areas 303 using the dot area curves 302, the dot areas 303 are used as inputs to an N-dimensional LUT 304 for interpolation. The steps in the LUT 304 are typically chosen to be evenly spaced in some particular space. If the steps are chosen to be evenly spaced in the dot area space, then the LUT 304 would be a uniform LUT. In general, however, the LUT would be non-uniform, if for example, the steps are chosen so that they are evenly spaced in $D_{50}$ CIELAB. Furthermore, the interpolation algorithm used is related to the halftone algorithm. Conventionally, multilinear interpolation is used, which corresponds to the Demichel equations, which in turn corresponds to the random dot screen, whereas tetrahedral interpolation would correspond to the dot-on-dot halftone screen. The output of LUT interpolation is not spectral reflectance, but rather spectral reflectance that has been modified by the "raising to power 1/n" transformation. In order to obtain spectral reflectance, the inverse transformation, the operation of raising to power n, is applied to the output of the LUT 304.

Determining a Printable Color Characterization Target

Figure 4:
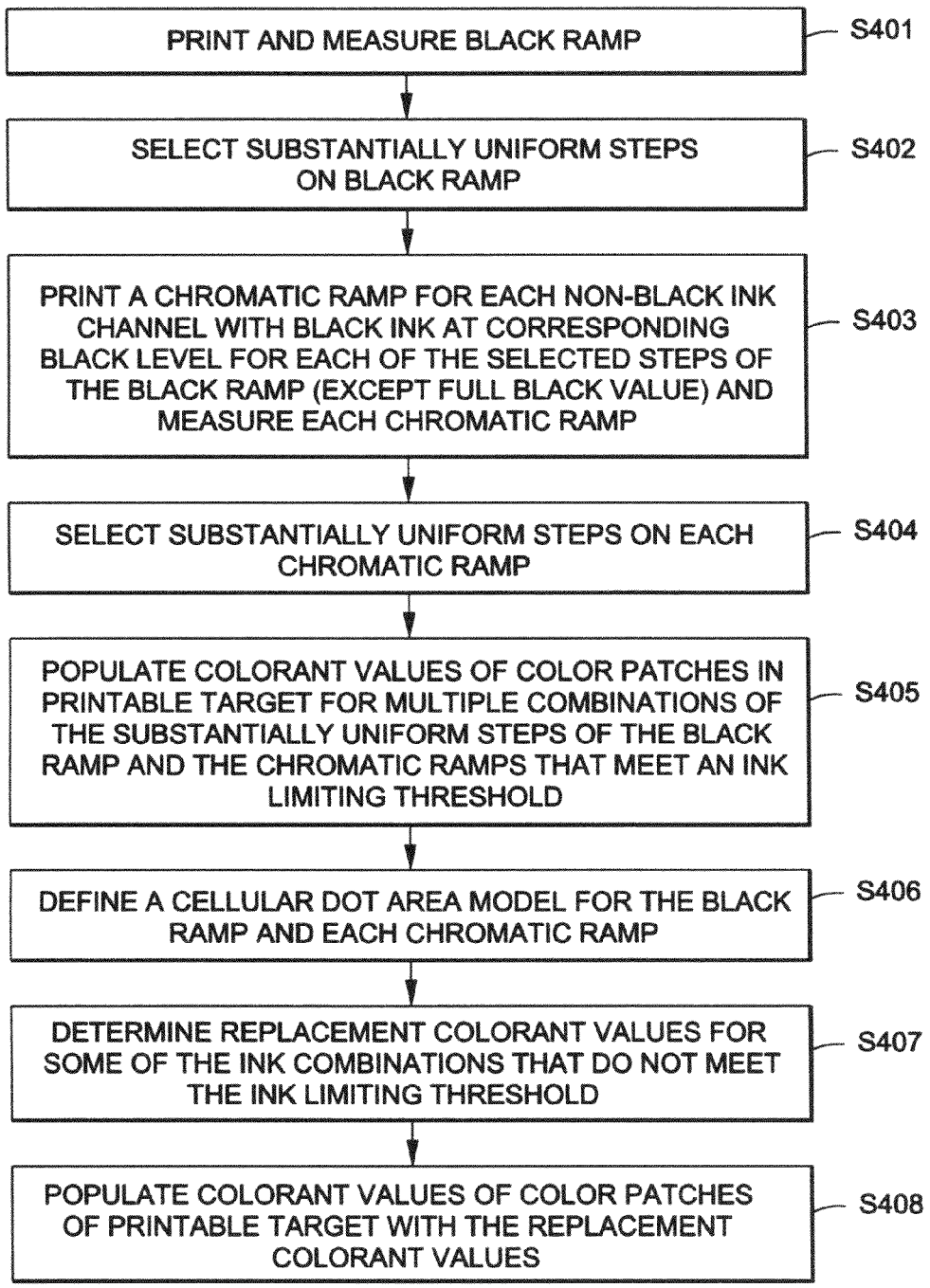
FIG. 4 is a flow chart for providing a detailed explanation of an exemplary embodiment of the present invention.

FIG. 4 is a flow chart for describing the process of this example embodiment, which is used to determine colorant values for color patches in a printable target that has many such color patches. The printable target is printable by a color printer that has multiple colorant channels including a black channel. The printable target is thereafter usable for color characterization of the color printer, and more specifically, is usable to build a (forward) spectral model LUT for the color printer.

In step S401 of FIG. 4, a black ramp is printed using the black channel, and color values of the black ramp are measured to obtain measured values thereof (step S401). In this regard, a decision is made as to the number of steps M for the black channel which are to be printed for the black ramp. Making a proper decision as to the value of M is discussed in detail below in connection with FIG. 7.

In step S402, substantially uniform steps on the black ramp as determined in a printer independent color space are selected. The number of substantially uniform steps is denoted as $m_K$ and is decided upon first. If for example, it is decided that $m_K$=4, then in addition to the required levels of K=0% and K=100%, 2 more levels are inserted in between. The substantially uniform steps are selected by applying principal component analysis (PCA) to the measured color values or color values derived from the measured color values of the black ramp. Then, a first principal component thereof is used to select the substantially uniform steps, wherein the substantially uniform steps are substantially invariant to small variations in the first principal component of the black ramp. This process of selecting substantially uniform steps using PCA is described in greater detail below, in connection with FIGS. 7 and 8, in section entitled "Analyze_Ramp Algorithm", in which an Analyze_Ramp algorithm is used to select the substantially uniform steps. In general, the Analyze_Ramp algorithm is applied to the measured color values or color values derived from the measured color values and the $m_K$ levels are determined. The $m_K$ levels are then saved and referred to as $k_1, k_2, \ldots, k_{m_K}$. It is noted that $k_1$=0 and $k_{m_K}$=1 by default, in which a convention has been adopted that device values are normalized to the range from 0 to 1.

In step S403, for each substantially uniform step of the black ramp (except the substantially uniform step corresponding to a full black value), a chromatic ramp with M steps for each of the multiple non-black colorant channels ($C_1, C_2, \ldots, C_{N-1}$) along with black ink at a corresponding black level $k_i$ is printed. The black levels are enumerated by the index i, wherein i=1, . . . , $m_K$. Further in step S403, color values of the chromatic ramps are measured to obtain measured values thereof.

Similar to deciding the number of steps M for the black ramp in step S401, the number of steps M for each printed chromatic ramp is also decided upon. In this regard, in this example embodiment, M is assumed to be the same for all printed ramps, including the black ramp and each of the individual chromatic ramps. However, it should be made clear that this process will work effectively with varying numbers of M for each of the different chromatic ramps.

In step S404, substantially uniform steps on each of the chromatic ramps as determined in a printer independent color space are selected. The substantially uniform steps on each of the chromatic ramps are selected by applying PCA to the measured color values or color values derived from the measured color values of each such chromatic ramp, and by using a first principal component thereof to select the substantially uniform steps. The substantially uniform steps are substantially invariant to small variations in the first principal component of each such chromatic ramp. Similar to the step of selecting the substantially uniform steps for the black ramp, this process of selecting substantially uniform steps for each of the chromatic ramps will be discussed in greater detail below, in connection with FIGS. 7 and 8, with regard to the Analyze_Ramp algorithm. The algorithm applied in steps S402 and S404 is the same algorithm, but in step S404, the algorithm is applied to each of the chromatic ramps individually, instead of to the black ramp as in S402.

In addition, in step S404, there are a relatively greater number of substantially uniform steps for each such chromatic ramp at smaller values of the black level, and a relatively smaller number of substantially uniform steps for each such chromatic ramp at larger values of the black level. In this regard, the number of substantially uniform steps is denoted as $m_i$ and is decided for each of the chromatic ink channels $C_1, C_2, \ldots, C_{N-1}$. In this embodiment, it is assumed that the same number of steps is used for each of $C_1, C_2, \ldots, C_{N-1}$ for a particular black level. In other words, this number, $m_i$, will vary depending on the black level, but will be the same for the chromatic inks for a particular black level. For example, if $m_K$=4, then $m_1$=5, $m_2$=4, $m_3$=3, $m_4$=2. The general idea is that the granularity of the $C_1 C_2 \ldots C_{N-1}$ sampling is decreased as K increases. The resulting $m_i$ levels are referred to as $c_{j1}^{(i)}, c_{j2}^{(i)}, \ldots, c_{jm_i}^{(i)}$, and are then stored. Similar to the values of k as determined above, $c_{j1}^{(i)}$=0 and $c_{jm_i}^{(i)}$=1.

With respect to the non-black ink combinations at different black levels, there is an advantageous effect by including a relatively greater number of substantially uniform steps for each chromatic ramp at smaller values of the black level, and having a relatively smaller number of substantially uniform steps for each chromatic ramp at larger values of the black level. More precisely, an advantageous effect is obtained in which colorant combinations tend to be excluded, hence reducing the number of color patches in the target, for high values of the black channel. Furthermore, this tends to exclude very dark color patches, whose measurements tend to be noisy and thus detrimentally affect mapping anyway. At the same time, because of this adjustment, although color patches are excluded, the resulting printable target tends to have colors that are more evenly spaced in a device independent color space such as a CIELAB color space.

For the substantially uniform step of the black ramp with a full black value (100% K), a minimal 2-step sampling (i.e., $m_i$=2) is used, and there is no need to apply the Analyze_Ramp algorithm for this K level because the outcome is predetermined, i.e., 0% and 100% are used for $C_1 C_2 \ldots C_{N-1}$ sampling. In this regard, it is conceivable that ramps printed with 100% black ink will be very dark and the noise of measurements is expected to be high, and a minimal $C_1 C_2 \ldots C_{N-1}$ sampling tends to reduce the number of such noisy measurements.

In step S405, colorant values of the color patches in the printable target are populated by using multiple combinations of the substantially uniform steps of the black channel and of the chromatic channels at the corresponding black levels that meet an ink limiting threshold. Determining whether the combinations of the substantially uniform steps of the black channel and of the chromatic channels at the corresponding black levels meet an ink limiting threshold is described in detail below, in connection with FIGS. 12 and 13, in section entitled "Ink Limiting".

By virtue of the foregoing, it is ordinarily possible to obtain a printable target containing plural color patches in which there are a practicable number of color patches which tend to fill the color space of the color printer, so as to obtain good color characterization for the color printer regardless of whether calorimetric or spectral measurements are used. As one example, in a six-colorant CMYRG printer, with a modest five steps in each ink, a conventional color target might have included $5^6=15,625$ color samples. Such a large number of color patches would be impractical to print and to measure, especially for a spectral characterization. Moreover, even if all 15,625 patches were printed and measured, the resulting data set might be too computationally intensive to yield a good color characterization. According to one example embodiment, however, it is possible to reduce the number of color patches down to around 3,650 to 4,040 color patches, even with practical ink limits of between 200% to 250%, and still yield good spectral or colorimetric characterization of the printer.

The combinations of the substantially uniform steps of the black channel and of the chromatic channels at the corresponding black levels that do not meet the ink limiting threshold are dealt with in steps S406 to S408. In particular, in step S406, a cellular dot area model for each of every printed and measured ramp described above is defined. Each cellular dot area model maps arbitrary colorant values of each ramp to corresponding dot areas of such colorant values. Defining such dot area models is described in more detail below, in connection with FIG. 10, under the section titled "Cellular Dot Area Model".

Then, in step S407, replacement colorant values for at least some of those combinations of the substantially uniform steps of the black channel and of the chromatic channels at the corresponding black levels that do not meet the ink limiting threshold are determined. Replacement colorant values are not necessarily determined for all the combinations which do not meet the ink limiting threshold, because some of the combinations might exceed the ink limiting threshold to the extent that the combination will not affect the interpolation result of any ink combination within the ink limit and can thus be safely ignored when populating a LUT, which is described in detail below in connection with FIG. 18. Furthermore, a process for determining which ink combinations that do not meet the ink limiting threshold will affect the interpolation of ink combinations is also described in detail below in connection with FIGS. 12 and 13.

Figure 14:
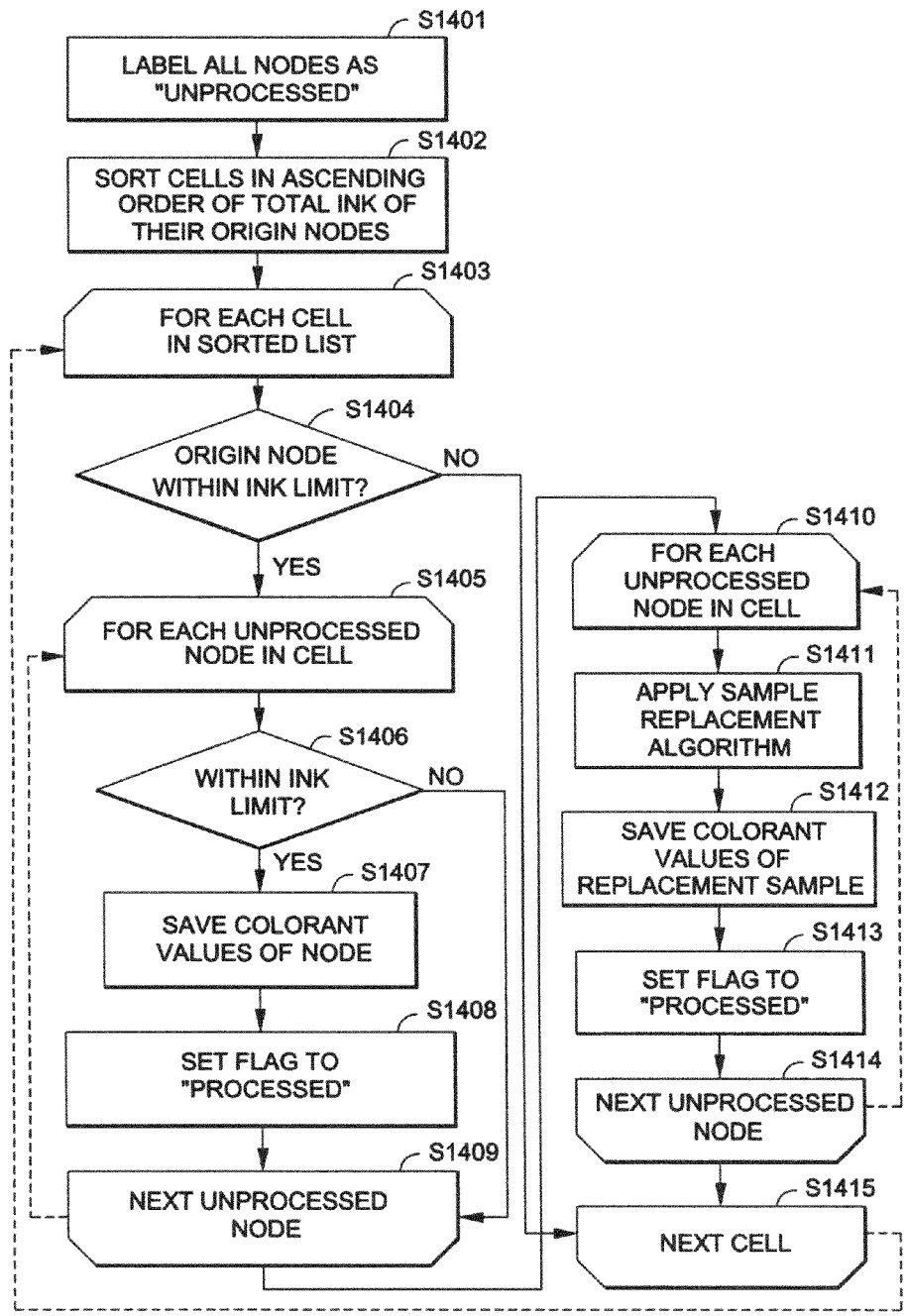
FIG. 14 is a flowchart for providing a detailed explanation of obtaining a specification of ink samples which will be printed in a printable target.
Figure 15:
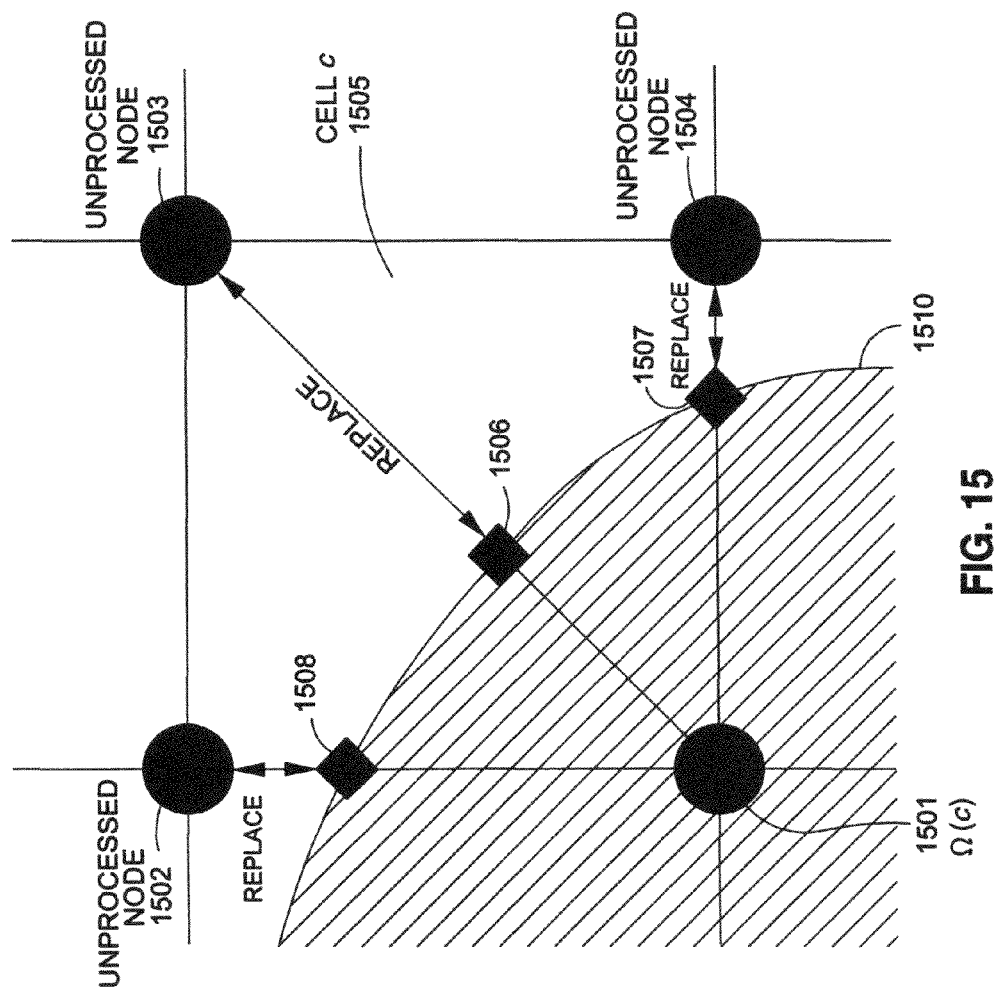
FIG. 15 is a view for explaining a Sample Replacement algorithm in accordance with an exemplary embodiment of the present invention.

Moreover, in step S407, the replacement value is determined by using a Sample Replacement Algorithm and an inverse of the cellular dot area model, which is described in detail below, in connection with FIGS. 14 and 15, in section entitled "Sample Replacement Algorithm". In this regard, no more than one replacement value is determined for each combination of the substantially uniform steps that does not meet the ink limiting threshold. Finally, colorant values of color patches in the printable target are populated with the replacement values (step S408).

As a result, with respect to determining replacement colorant values, there is an advantageous effect obtained by replacing the colorant values for at least some of the multiple combinations of the substantially uniform steps of the black channel and of the chromatic channels at the corresponding black levels that do not meet the ink limiting threshold. More precisely, an ordinary approach to selection of color patches for color characterization is to discard all colors that do not meet the ink limiting threshold. The advantageous effect is obtained here by including more color patches to populate the LUT and therefore creating a more accurate characterization of the color printer.

In addition, it is noted that in step S403, each ramp is printed with a total ink of at most 200%. Thus, it is assumed that the substrate on which the ramp is printed is capable of this level of ink coverage, which is usually not a problem in practice.

Finally, it is noted that the printing of each chromatic ramp is independent from the printing of the other chromatic ramps. Therefore, it is possible to arrange only 2 prints, one containing just the black ramp printed in step S401, and then another containing all the ramps printed in step S403.

In this example embodiment, it is assumed that there is a black ink in the printer, and a strategy of varying the granularity of the chromatic ink sampling based on the black level is used. A similar strategy has been used in CMYK printing and incorporated in the standard IT8.7/3 target. In general, the observation is that the granularity of the CMY printable target should change based on the K level. For a small K, the CMY sampling is finer, while for a larger K, the CMY sampling is coarser. Besides reducing the number of samples, this example embodiment also helps with the problem of high noise level in the measurements of samples printed at high K level. The samples at high K level are very dark, and spectral reflectances are small with little variation across the CMY plane. Too fine a sampling of the CMY plane at a high K level would in fact create a LUT with undesirable noise fluctuation.

Furthermore, in this example embodiment, it is assumed that the black ink can be singled out. Thus, the validity of singling out the black ink in the printer modeling should be discussed. Whether or not the black ink can be singled out depends on the interpolation algorithm used in the Neugebauer LUT. Singling out the black ink is equivalent to the separability of the interpolation algorithm with respect to the black channel. If the interpolation algorithm is multilinear, which corresponds to random dot placement, then in fact every channel is separable, i.e., the N-D interpolation can be broken down into a succession of 1D linear interpolations. Such is not the case for tetrahedral interpolation, which corresponds to dot-on-dot placement. Hence, in theory, this example embodiment seems to be only valid for random dot halftone, or at least random dot for black ink, or even more generally, a halftoning algorithm in which the placement of black dot does not depend on other inks. However, in practical terms, the behavior of halftone is never perfect. Because of practical issues such as misregistration, there is no real world halftone that is perfectly random dot or dot-on-dot. Furthermore, the use of Cellular Neugebauer, especially with many cellular subdivisions, has moved the model more towards the statistical approach, and the use of interpolation has become more of a mathematical technique than a modeling of the underlying halftone process. Thus, while it may be true that singling out the black ink and interpolating between different K levels could mean performing tetrahedral interpolation on the non-black ink channels followed by a 1D interpolation on the black channel, which is not the same as performing tetrahedral interpolation on all the ink channels and hence deviates from modeling the dot-on-dot halftone, such an approach may still be considered legitimate if there is empirical evidence that the model predicts accurate results when compared to real world measurement data.

Lastly, in this example embodiment, it is assumed that the printer has N inks $C_1, C_2, \ldots, C_{N-1}, K$, where K is the black ink, and $N \geq 4$. The algorithm for determining the color values of the color patches of the printable target consists of printing the color ramps in sequence and then analyzing the prints. For concreteness, all the color ramps are printed with the same number of uniform steps, M, e.g. M=18. However, it should be clear that the algorithm is capable of handling a different number of steps for each color ramp, if using a different number of steps for different ramps is beneficial in a particular situation. Furthermore, in this example embodiment, the Analyze_Ramp algorithm is used to analyze the measurements of the ramps, and the algorithm requires a color space to work in, which will be described in more detail below. Again for concreteness, it is assumed that the same space is used for all ramps, e.g. CIELAB under $D_{50}$. The choice of space determines what measurements should be made. For example, if CIELAB under $D_{50}$ is used, then measurements in XYZ under $D_{50}$ should be made. Alternatively, spectral reflectance measurements can be made, after which integration with $D_{50}$ illuminant would be performed to obtain the XYZ, which would then be converted to LAB.

Principal Component Analysis (PCA)

Background information will now be given concerning the use of PCA in the selection of substantially uniform steps. Traditionally, in the field of CMYK printing, linearization of the ink channels refers to 1D transformations, or "curves", that are applied to each channel so that the cyan, magenta, yellow and "visual" densities exhibit linear dependence with respect to the linearized printer channels. With the advent of printers with inks other than CMYK, the inadequacy of the traditional densities has become apparent. Other methods implemented have included linearizing with respect to other quantities such as Y or L*. In general, the methods implemented preferably linearize the channels so that the resulting channels are "linear" in some space, such as CIELAB space, or a perceptual linear space such as CIECAM02, or some other space such as the spectral reflectance space. All of these spaces have dimensions higher than one, and different choices of space will lead to different linearization curves.

Many problems exist when linearizing a channel so that it becomes "linear" in some higher dimensional space. The process of linearization is well understood if the space is 1D, for example, when the quantity to be linearized against is a density, Y, L* or the like. For a higher dimensional space, while intuition suggests transforming the channel so that equal increments in the transformed channel produce equidistant samples with respect to the metric of the space, mathematical construction of the curve requires a 1D quantity to linearize against.

For example, Table 1(a) shows sample CIELAB measurements of a cyan ramp with uniform steps in the printer device value. When linearizing the cyan ink channel so that after linearization, the channel would exhibit linear behavior in CIELAB space, a common choice would be to use L* as the quantity to linearize against. However, as the data suggest, a* and b* (especially b*) also contribute significantly to the CIELAB distance.

TABLE 1(a)

Sample CIELAB measurements of a chromatic ink ramp.

| Device % | L* | a* | b* |
|---|---|---|---|
| 0 | 92.61685 | 2.070695 | −9.06692 |
| 10 | 92.39609 | 1.825333 | −9.16571 |
| 20 | 91.68179 | 1.083493 | −10.1756 |
| 30 | 89.58209 | −1.1636 | −13.0542 |
| 40 | 86.10997 | −4.82813 | −17.386 |
| 50 | 80.96423 | −9.56461 | −23.8365 |
| 60 | 74.4818 | −16.0585 | −31.318 |
| 70 | 68.71475 | −21.594 | −37.9662 |
| 80 | 63.44819 | −26.332 | −43.4799 |
| 90 | 56.29794 | −29.431 | −49.2388 |
| 100 | 48.75844 | −27.2759 | −52.6619 |

Figure 5A:
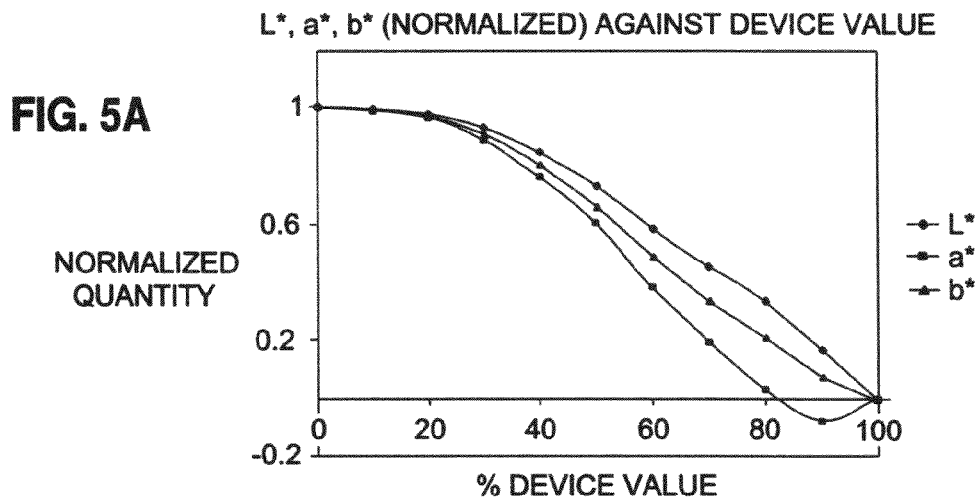
FIG. 5(a) is a plot of normalized quantities of sample CIELAB measurement data against printer device values.

The quantities of Table 1(a) normalized are plotted against the device values in FIG. 5(a). As shown in FIG. 5(a), each of the curves L*, a* and b* are quite different from each other. Moreover, it is not clear which of the curves L*, a* and b* is the correct one, or in other words, which coordinate would serve as the best curve to linearize the CIELAB distance. However, it is noted that a mathematical reason for not selecting a* is that the curve is not invertible.

In the exemplary embodiment described above with regards to FIG. 4, Principal Component Analysis (PCA) is used to reduce multidimensional data sets to lower dimensions for a better analysis, instead of using the traditional coordinates to linearize against. Table 1(b) contains principal component values, respectively columns P1, P2 and P3, which were obtained by performing PCA on the CIELAB data of Table 1(a). One major benefit of PCA is that the transformation is orthogonal and therefore preserves the distance in the particular space. In the case of CIELAB space, PCA will preserve the CIELAB distance, or $\Delta E^*_{ab}$. In the case of a spectral reflectance space, PCA will preserve the Euclidean distance in the spectral reflectance space, which is proportional to the spectral RMS error.

TABLE 1(b)

Principal components for the data in Table 1(a) obtained using Principal Component Analysis (PCA).

| Device % | P1 | P2 | P3 |
|---|---|---|---|
| 0 | 27.69829 | 1.045675 | −0.11462 |
| 10 | 27.38507 | 1.009472 | −0.25348 |
| 20 | 25.95357 | 0.865022 | −0.15176 |
| 30 | 21.77146 | 0.400748 | 0.045962 |
| 40 | 15.15545 | −0.28945 | 0.072296 |
| 50 | 5.664197 | −0.81233 | 0.478298 |
| 60 | −6.13191 | −1.792 | 0.238432 |
| 70 | −16.5052 | −2.48778 | 0.138741 |
| 80 | −25.4681 | −2.84093 | −0.21953 |
| 90 | −34.927 | −0.74352 | −0.37092 |
| 100 | −40.5958 | 5.645079 | 0.136583 |

Figure 5B:
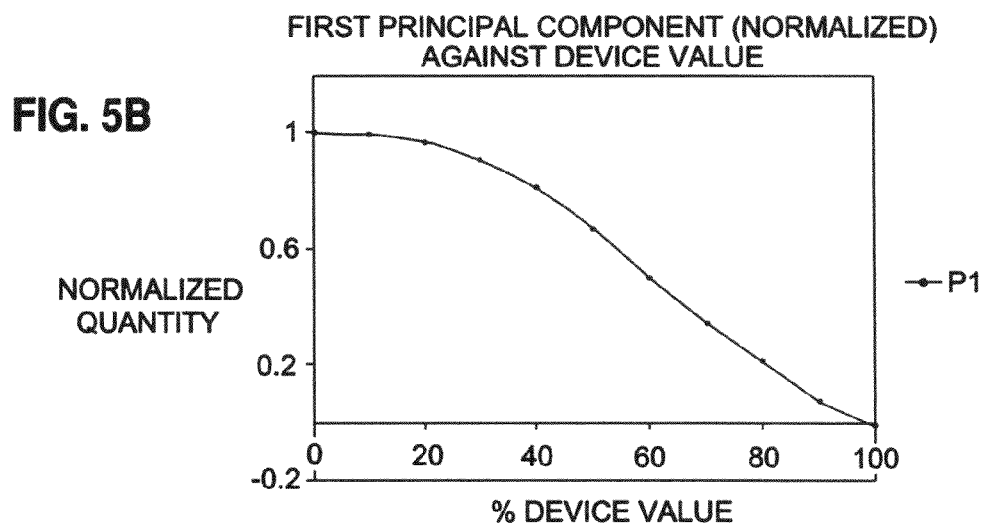
FIG. 5(b) is a plot of the first principal component of the sample CIELAB measurement data of FIG. 5(a) against the printer device values.

FIG. 5(b) shows a plot of normalized values of the first principal component of Table 1 (b) against the device values.

Figure 5C:
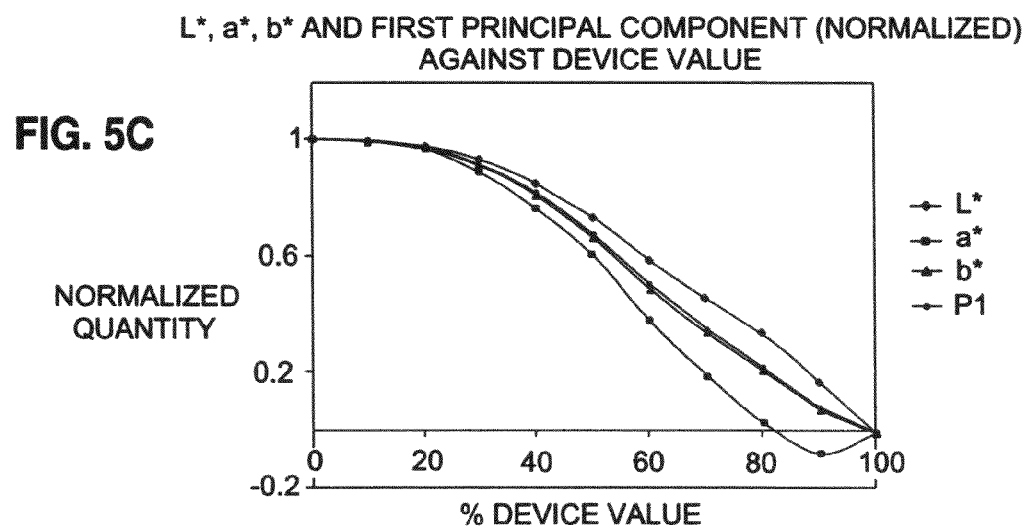
FIG. 5(c) is a plot which combines the plots of FIGS. 5(a) and 5(b).

FIG. 5(c) shows a plot of both the plotted curves L*, a* and b* of FIG. 5(a) and the first principal component curve of FIG. 5(b). As shown in FIG. 5(c), the first principal component curve matches the b* component curve most closely. This result would not be surprising if one knew that the ramp was produced by cyan ink. For example, if one knew that the magenta ink was used, then the a* coordinate would be a better choice, whereas if it was black ink, the L* coordinate would be a better choice. On the other hand, it may not be apparent which ink was used simply from the measurement data. In addition, for inks with a different hue, it is conceivable that none of the L*, a* or b* would be the optimal choice. Using the PCA approach allows for handling of arbitrary ink without having to restrict use to L*, a* or b*, or any of the built-in coordinates in a particular space.

In sum, with respect to the application of PCA to the measured color values (such as spectral reflectance) or color values derived from the measured color values (such as CIELAB value), there is an advantageous effect in that PCA analysis will yield a first principal component which provides a measure of separation in the space through automatic data analysis, without the need to know the actual color name of the colorant channel. In addition, because PCA is an orthogonal transformation, PCA tends to preserve distances in color space, whether it is in the format of calorimetric, perceptual or spectral.

Figure 6:
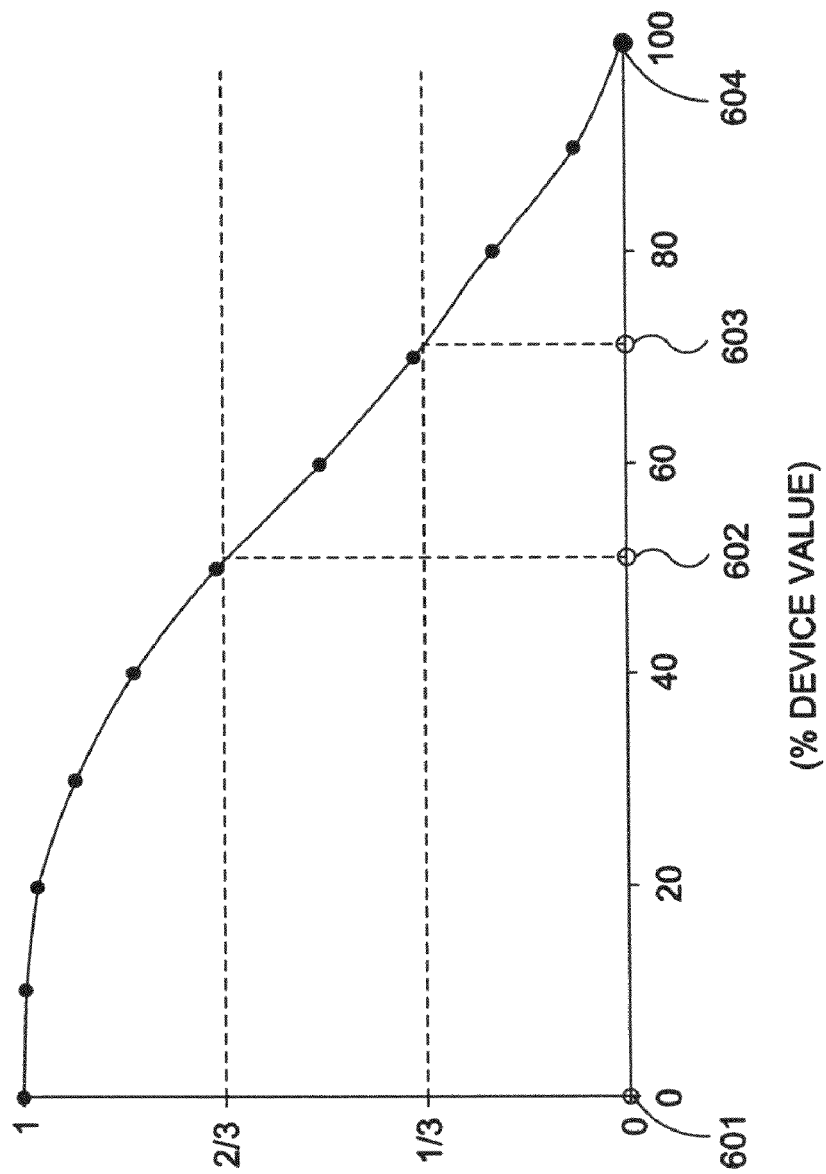
FIG. 6 is a plot for explaining a common strategy for determining steps for a LUT of an ink channel using a linearization approach.
Figure 7:
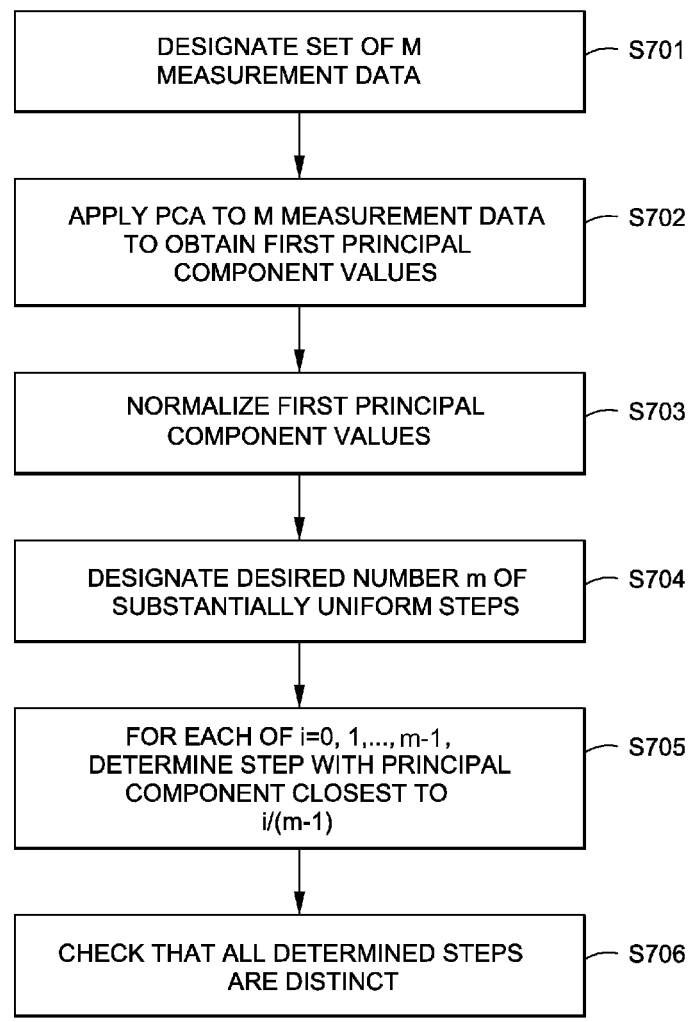
FIG. 7 is a flowchart for providing a detailed explanation of an Analyze_Ramp algorithm for selecting substantially uniform steps of an ink ramp according to an exemplary embodiment of the present invention.

When choosing steps for the LUT in each ink channel, a common strategy to reduce interpolation error is to choose them so that they are evenly spaced in some space such as the dot area space or CIELAB space. One typical approach is to first construct the linearization curves and then look up the device values which correspond to evenly spaced points in the variable to be linearized against. This approach is illustrated in FIG. 6. As shown in FIG. 6, four steps are chosen on a given linearization curve by looking up the device values which correspond to 0, ⅓, ⅔ and 1. These resulting chosen steps are shown as steps 601, 602, 603 and 604, respectively.

In the approach described above with reference to FIG. 6, different steps will be generated each time, even for the same printer, under two different runs of characterization. This is because the choice of the steps depends sensitively on the linearization curves, wherein different runs of characterization will generate slightly different measurements, resulting in slightly different linearization curves. There is nothing inherently detrimental about having different steps for each characterization. However, having the same steps for different runs provides the benefit that the measurements can be compared.

In the example embodiment described with regard to FIG. 4, the ink channels are not linearized in the conventional way. An acknowledgment is made as to the desire to have steps that are evenly spaced, however the steps are believed to only need to be approximately evenly spaced. In other words, the steps still depend on the linearization curves, but the dependence is made less sensitive so that the steps do not change if there is a slight change in the curves, due to a slight change in measurement data from run to run.

Selecting Substantially Uniform Steps

With respect to the selection of substantially uniform steps that are substantially invariant to small variations in a first principal component, there is an advantageous effect in which the chosen steps tend to remain constant even across different measurements of a particular printer. More precisely, an ordinary approach to determination of steps for each colorant channel is to determine steps in the colorant channel that are precisely equal to each other when measured in some predetermined color space which may be calorimetric, perceptual or spectral. Such an approach would result in different steps in the colorant channels for each different run of measurements of the same printer, since the determination of steps would then depend sensitively on the linearization curves. Different runs of measurements would therefore likely generate slightly different steps in the colorant channels. While such differences might not be significant to ensuing colorimetric or perceptual uniformity, such differences can often cause difficulties to color scientists and printer R&D engineers, who are trying to compare one run against another. For color scientists and printer R&D engineers, therefore, an advantageous effect of identifying substantially uniform steps, as opposed to strictly uniform steps, is that the steps in the colorant channel tend to be identical from one run of a color target generation to another run of a different target generation, allowing more direct comparisons of multiple runs.

In the example embodiment of FIG. 4, a fixed number of steps M (e.g., 18) in a channel is decided upon first as described above. For example, the chosen steps could be uniformly spaced in the device space. Using the above described PCA approach, a first principal component corresponding to each step is determined. Then, instead of constructing a linearization curve from these samples, the principal component will be used as a measure to choose among these steps the ones that are substantially uniform, as described above. This selection of substantially uniform steps is defined in terms of an algorithm denoted Analyze_Ramp and is described in more detail below with reference to FIG. 7.

Analyze_Ramp Algorithm

In step S701, a set of M measurement data is designated, wherein the M measurement data resides in some space (e.g., CIELAB, CIECAM02, or spectral reflectance space). M should not be too small, and typical choices for M are 16, 18, or even 256. In step S702, PCA is applied to the M measurement data in order to calculate the first principal component values of the measurement data. Then, the first principal component values are normalized (step S703) so that they lie in the range [0,1] with the minimum principal component becoming 0 and the maximum component becoming 1.

In step S704, a desired number m of substantially uniform steps in the given space is designated. m should be less than or equal to M, and is typically a small number, such as 4. Then, for each of i=0, 1, . . . , m−1, the step that has a principal component that is closest to the value i/(m−1) is determined. This is the chosen ith step. In step S706, all of the chosen steps are checked to be distinct from one another. If that is not the case, an error condition is raised. An error indicates that either m is too large or M is too small. For example, if the printer is highly nonlinear, it may be necessary to print 256 steps for the ramp to capture the nonlinear response curve instead of 18.

Figure 8:
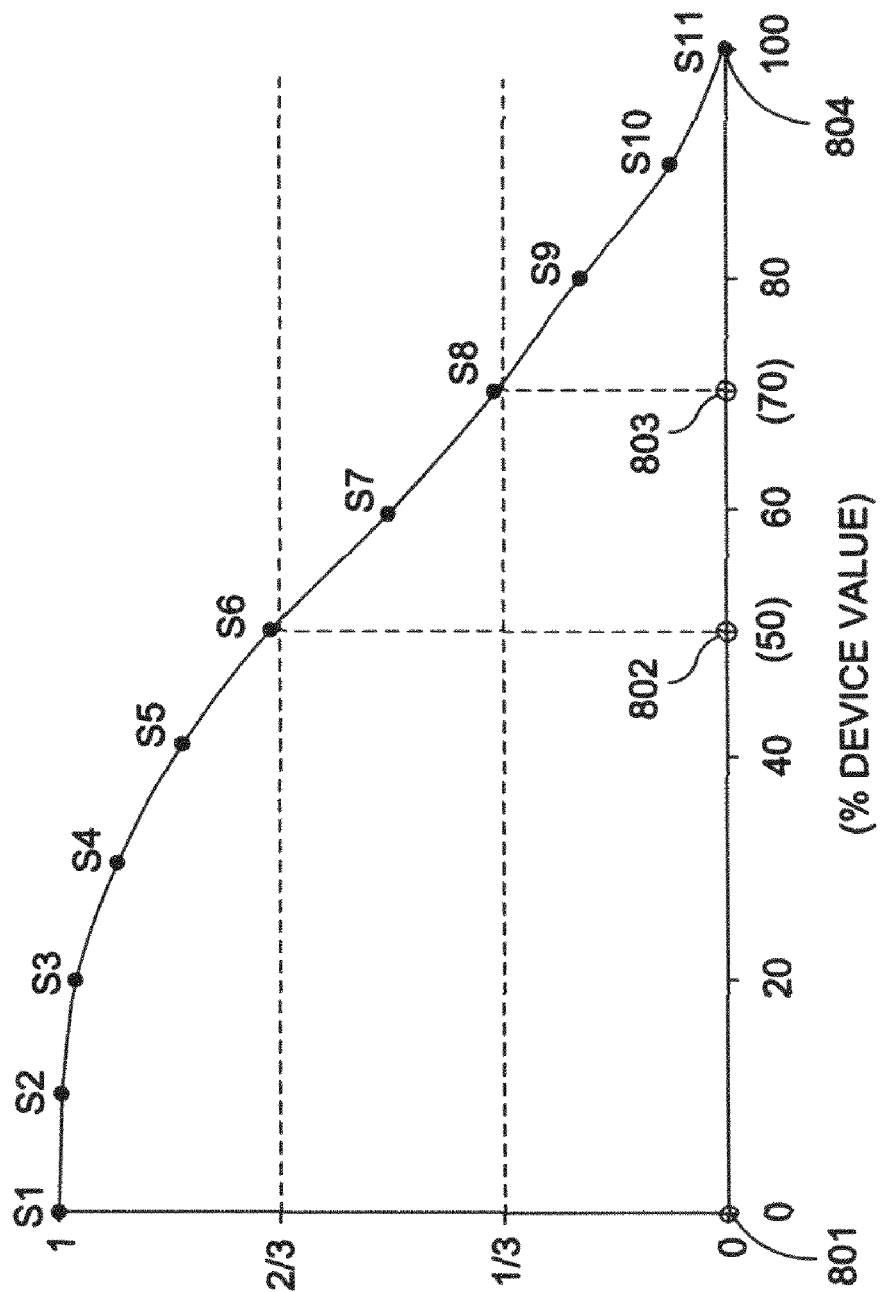
FIG. 8 is a plot for explaining an Analyze_Ramp algorithm for selecting substantially uniform steps according to an exemplary embodiment of the present invention.

FIG. 8 shows an example outcome of applying the Analyze_Ramp algorithm. As shown in FIG. 8, 11 steps (steps S1 to S11) are uniformly spaced in the device space, of which 4 steps are chosen such that they are as substantially uniformly spaced as possible in CIELAB space. Based on the Analyze_Ramp algorithm, the chosen steps are step S1, step S6, step S8 and step S11, referenced as steps 801 to 804, respectively.

Finally, it is noted that the space used in the Analyze_Ramp algorithm is an independent choice. For example, even if the goal is to build a spectral printer model, nothing prevents using CIELAB under $D_{50}$ in the algorithm, i.e., the space does not have to be a spectral reflectance space.

Using the Analyze_Ramp algorithm, it is possible to select the substantially uniform steps in each ink channel. According to the CYNSN model, all combinations that correspond to the chosen steps would be printed. For example, suppose that a 6-ink printer is to be characterized, such as the Canon i9900 inkjet printer that is equipped with cyan, magenta, yellow, black, red and green ink. With a modest 5 steps in each ink, a total of $5^6$=15625 samples would need to be printed. Printing and measuring this many samples is quite an undertaking. Accordingly, one advantage of this example embodiment is that it greatly reduces the number of samples needed for a printable target, which will be further explained in detail below.

Figure 9:
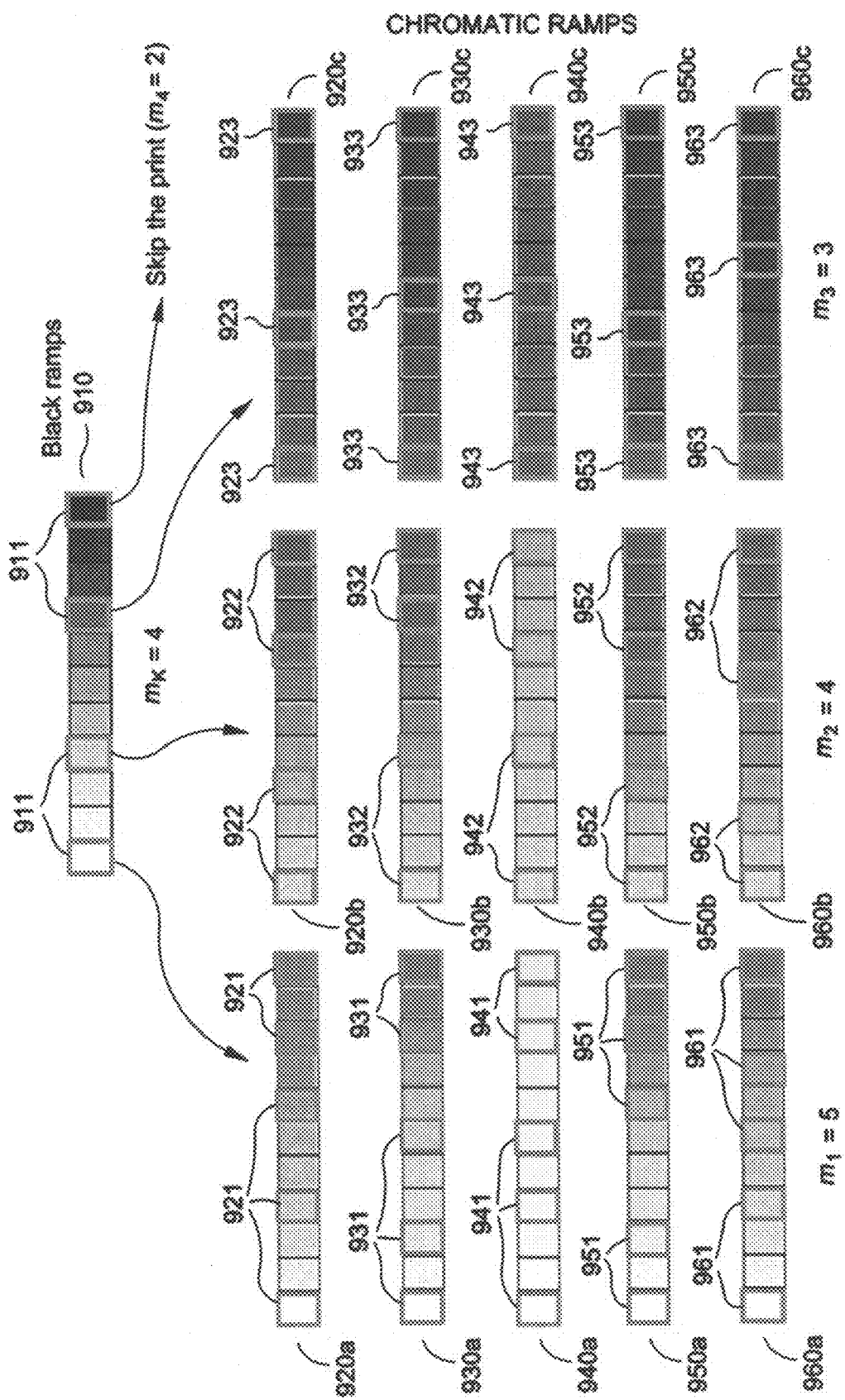
FIG. 9 shows an exemplary outcome from the flowchart depicted in FIG. 4.

FIG. 9 shows an example output from a CMYKRG printer, using the example embodiment described above with regards to FIGS. 4 and 6.

As shown in FIG. 9, a black ramp 910 was printed in 11 steps, $m_K$, the number of substantially uniform steps, was chosen to be 4, and the substantially uniform steps were determined by applying the Analyze_Ramp algorithm to the measured data of the black ramp 910. These substantially uniform steps 911 are shown as the highlighted squares on the black ramp 910. Then, for each black level at the substantially uniform steps of the black ramp 910, a chromatic ink ramp for each of the chromatic inks (CMYRG) was printed in 11 steps. Thus, cyan chromatic ink ramps 920a to 920c, magenta chromatic ink ramps 930a to 930c, yellow chromatic ink ramps 940a to 940c, red chromatic ink ramps 950a to 950c, and green chromatic ink ramps 960a to 960c, were printed with corresponding black levels of $k_1$, $k_2$ and $k_3$. No chromatic ramps were printed for black level $k_4$ because the choice of substantially uniform steps is already predetermined as discussed above with regards to FIG. 4.

With $m_K=4$ black levels, the values of $m_i$ were chosen to be $m_1=5$, $m_2=4$, $m_3=3$, $m_4=2$. Thus, for chromatic ink ramps 920a to 960a, $m_1=5$ substantially uniform steps of the ramps (steps 921 to 961, respectively) will be determined, for chromatic ink ramps 920b to 960b, $m_2=4$ substantially uniform steps of the ramps (steps 922 to 962, respectively) will be determined, and for the chromatic ink ramps 920c to 960c, $m_3=3$ substantially uniform steps of the ramps (steps 923 to 963, respectively) will be determined. Thus, using the exemplary values of $m_1=5$, $m_2=4$, $m_3=3$, $m_4=2$, and ignoring the fact that some ink combinations are over an ink limit at the moment which will be dealt with below, the number of samples required for the printer characterization is $5^5+4^5+3^5+2^5=4424$, which is a considerable reduction over the original full 5-step sampling that requires $5^6=15625$ samples.

In addition, the measurements of the ramps will also be used to determine the relationship between the printer device values and dot areas. In the case when a ramp is not printed (e.g., for K=100%), the number of substantially uniform steps is always taken to be 2, and this relationship is assumed to be linear. In general, if the ramps have been printed and measurements made, then pairs of corresponding device values and dot areas can be determined using any dot gain model, and using interpolation in between. In this example embodiment, the Yule-Nielsen model is extended to a Cellular Yule-Nielsen model, and used as the dot gain model, which will be described in detail below.

Cellular Dot Area Model

After step S404 in FIG. 4, the following results are obtained: For black ink, a set of steps (black levels) at $k_1=0$, $k_2, \ldots, k_{m_K}=1$; At each black level $k_i$, a set of steps for each chromatic ink, $$c_{11}^{(i)}=0, c_{12}^{(i)}, \ldots, c_{1m_i}^{(i)}=1;$$

$$c_{21}^{(i)}=0, c_{22}^{(i)}, \ldots, c_{2m_i}^{(i)}=1;$$

$$\vdots$$

$$c_{N-1,1}^{(i)}=0, c_{N-1,2}^{(i)}, \ldots, c_{N-1,m_i}^{(i)}=1$$

The set of all combinations of these steps constitutes a sampling of the whole printer space. The same steps are also used to create the "Cellular Yule-Nielsen Model" for each chromatic ink channel at each black level.

Figure 10:
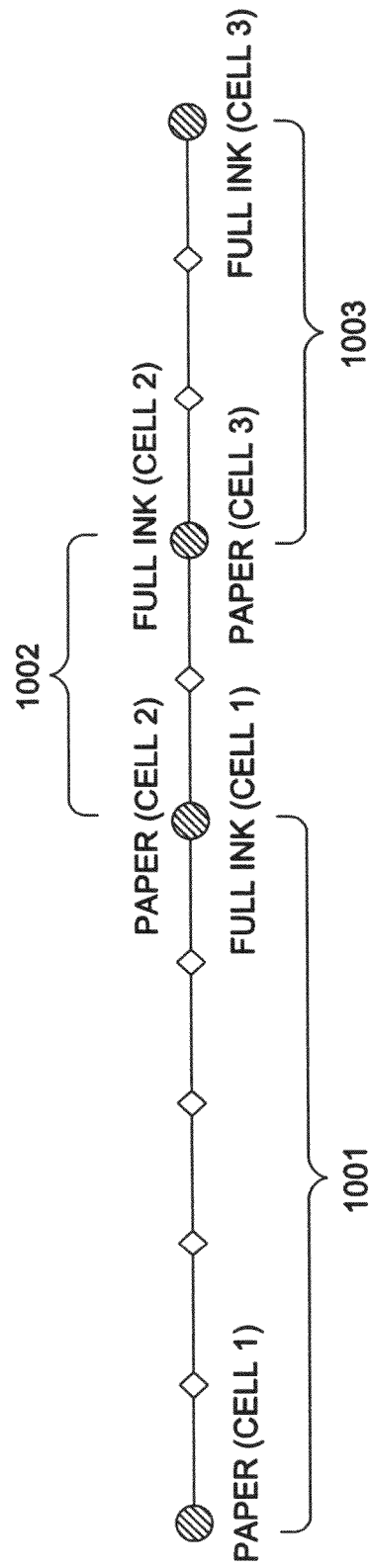
FIG. 10 is a view illustrating an ink ramp depicted in nodes and cells.

In general, a ramp of M steps exists, and m of these M steps have been identified to be the "nodes" of the cellular model. If the M steps are identified by $s_1, s_2, \ldots, s_M$, then the m nodes are identified by quoting their indices, which are denoted by $i_1, i_2, \ldots, i_m$. An example with M=11, m=4 and $i_1=1$ (0%), $i_2=6$ (50%), $i_3=8$ (70%), and $i_4=11$ (100%) is shown in FIG. 10. In FIG. 10, the nodes are depicted by circles, wherein "cells" 1001, 1002 and 1003 are formed from such nodes, and the steps that are not used as nodes are depicted by diamonds.

As discussed above, the classical Yule-Nielsen equation is as follows:

$$R_\lambda^{1/n}=aR_{\lambda,1}^{1/n}+(1-a)R_{\lambda,0}^{1/n}.$$

This model will be denoted $YN_n$. By applying the "modifying transformation" for the spectral reflectance $$\phi(R)=R^{1/n}, \phi^{-1}(\tilde{R})=\tilde{R}^n$$

to $YN_n$, $YN_n$ becomes:

$$\phi(R_\lambda)=a\phi(R_{\lambda,1})+(1-a)\phi(R_{\lambda,0}).$$

As discussed above, n is usually obtained by optimization. In practice, it is found that the optimal n may not be found because there is no local minimum. One solution to this problem is to limit the search for optimal n to some upper bound. For example, an observation has been made to settle with n=10, because a trend was noticed in which the total color difference continues to decrease as n increases, and an argument was made that if too large an n was used, the operation of applying $\phi$ and $\phi^{-1}$ would cause numerical instability.

An alternative model to $YN_n$, is to use "spectral density". In other words, the model, in terms of spectral reflectance, is:

$$\log(R_\lambda)=a \log(R_{\lambda,1})+(1-a)\log(R_{\lambda,0}).$$

Equivalently, the modifying transformation is $\phi(R)=\log(R)$, so that $\phi^{-1}(\tilde{R})=10^{\tilde{R}}$. In fact, it is not difficult to see that this corresponds to the Yule-Nielson model as $n \to \infty$. Thus, this model will be denoted as $YN_\infty$.

In either $YN_n$ or $YN_\infty$, there is the notion of "paper white", represented by the reflectance $R_{\lambda,0}$ and "full ink", represented by the reflectance $R_{\lambda,1}$. A "relativized" version of these notions leads to the cellular model. In particular, in FIG. 10, the notions of "relative paper white" and "relative full ink" are demonstrated in cells 1001, 1002 and 1003. By applying the Yule-Nielsen model to each cell, and scaling and translating the dot area appropriately, the following Cellular Yule-Nielson model, which is a cellular dot area model, is obtained: If a lies between $(j-1)/(m-1)$ and $j/(m-1)$ where $1 \leq j \leq m-1$, then the model predicts spectral reflectance $R_\lambda$ for "generalized dot area" a via the equation $$\varphi(R_\lambda) = a'\varphi(s_{i_{j+1}},\lambda) + (1-a')\varphi(s_{i,j},\lambda)$$

$$a' = (m-1)\left(a - \frac{j-1}{m-1}\right)$$

If $\phi(R)=R^{1/n}$, then the resulting model will be denoted $CYN_n$, which is Cellular Yule-Nielsen with n-factor n. Similarly, if $\phi(R)=\log(R)$, then the resulting model will be denoted $CYN_\infty$. Obviously, the variable a, being a piecewisely defined quantity from local dot areas from the cells, is no longer modeling a physical dot area. Rather, it is simply a modeling parameter that takes values between 0 and 1.

Dot area curves from the cellular models are determined in the same way as their non-cellular counterparts. Namely, for each of the measured spectral reflectance $s_i$ for the ith step of the ramp (i=1, 2 . . . , M), we determine the corresponding dot area a by minimizing the color difference between measured reflectance and predicted reflectance:

ColorDifference($CYN(a),s_i$)).

The ColorDifference( ) function can be the spectral RMS error, a delta-E under an illuminant such as $D_{50}$, or sum of delta-E's under multiple illuminants, etc. In the function, CYN is either $CYN_n$ or $CYN_\infty$. In the case of $CYN_n$, the usual procedure applies: A sequence of dot area determinations is carried out for various values of n, then the optimal n is determined by minimizing the color difference over all samples. Once the dot areas for the measured steps are determined, a dot area for a general device value can be obtained by interpolation on the measured steps.

Figure 11:
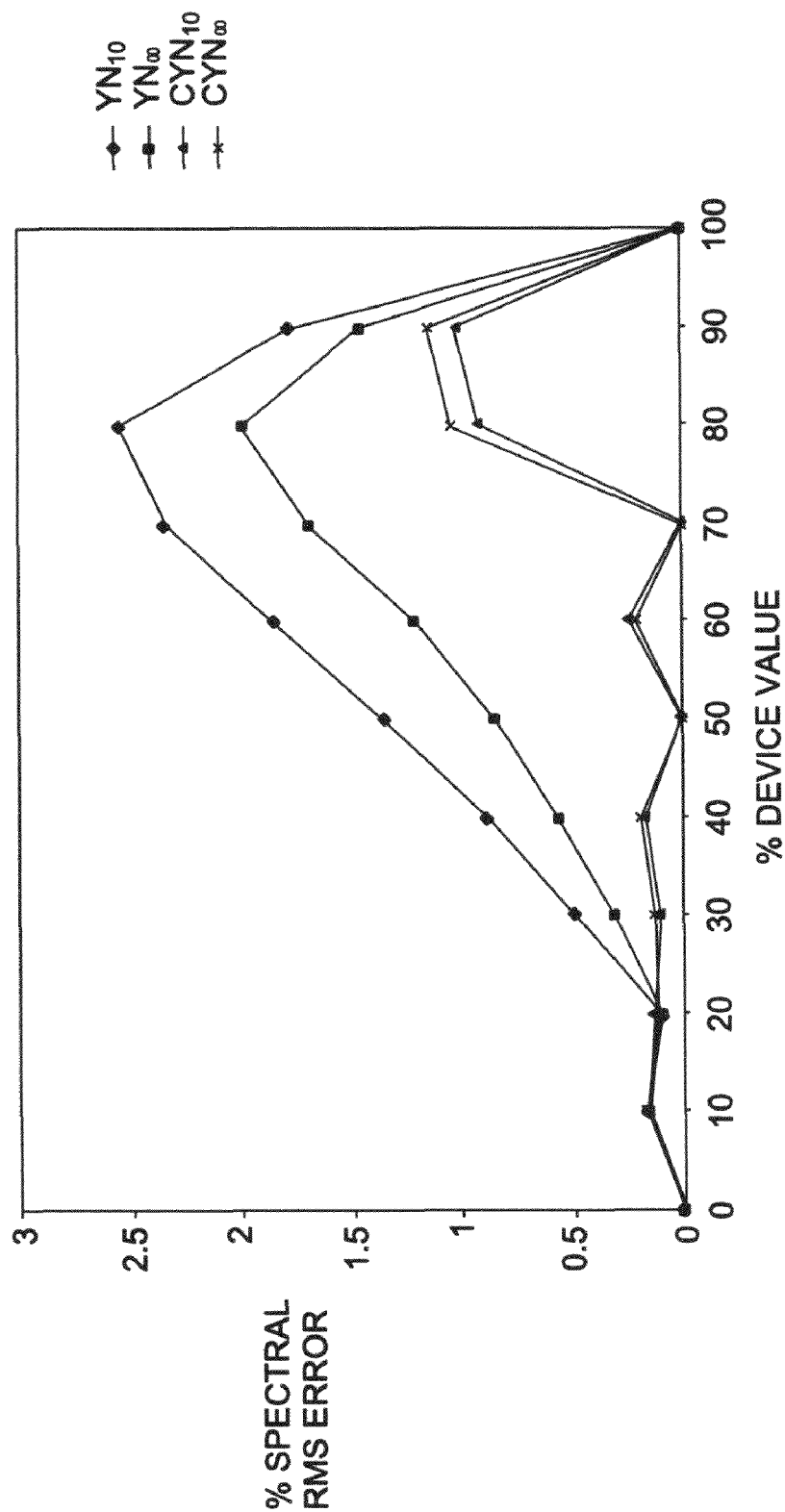
FIG. 11 is a plot showing spectral root-mean-square (RMS) errors at each step of an ink ramp for different models used to model dot areas.

FIG. 11 shows a plot of the percentage spectral RMS errors on the steps for each of the above described models. As shown in FIG. 11, a total number of 11 steps were measured, and for the cellular models $CYN_n$ and $CYN_\infty$, the 50% step, 70% step (along with the 0% step and 100% step) were used as nodes (the substantially uniform steps). The fitting was performed using the spectral RMS error as the ColorDifference metric. For the cellular models, the errors at the nodes are zero by definition. As is clear from FIG. 11, the cellular models provide a better fit compared to their non-cellular counterparts.

According to this aspect, the definition of a cellular dot area model by applying a Yule-Nielsen model to each cell between the substantially uniform steps on a ramp provides an advantageous effect in which the dot area model provides better prediction than those created using the traditional approach. More precisely, a more traditional approach to defining a dot area model might be the application of a Yule-Nielsen model to the whole ramp, using only the first and last step of the ramp. Such models can provide a coarse prediction of dot area corresponding to a colorant value. Applying the Yule-Nielsen model to each cell between the substantially uniform steps on a ramp increases the degrees of freedom of the model and therefore, improves the overall accuracy of the model fitting.

Ink Limiting

Thus far, a method for choosing printable targets for a printer device space that are dependent on the K level has been described. Furthermore, a Cellular Yule-Nielson model, i.e. cellular dot area model, for constructing the black dot area curve, and on each K level, for constructing dot area curves for the chromatic inks, has been described. Now, a method for populating the (N−1)-D LUTs in accordance with an exemplary embodiment will be described.

In theory, the (N−1)-D LUTs for the chromatic inks $C_1$ $C_2 \ldots C_{N-1}$ at each K level can be populated by the ($\phi$-modified) spectral reflectance measurements of samples printed with the appropriate ink combinations. However, due to practical limit of substrate not being able to hold ink density above a certain threshold, not all ink combinations can be printed. In order to describe a solution to this problem, the computational architecture of the printer model in the example embodiment will be described first. The whole computational architecture is depicted in FIG. 12, to be compared with the corresponding pathway for the classical CYNSN model shown in FIG. 3. It is noted that due to the definition of the "generalized dot area" as described above, all the LUTs, the 1D black dot area LUT, and the (N−1)-D LUTs for the chromatic inks at each black ink level, are uniform, i.e., the steps are uniformly spaced. The LUTs for the chromatic inks have a different number of steps at different black ink levels, but the steps are all uniform.

Figure 12:
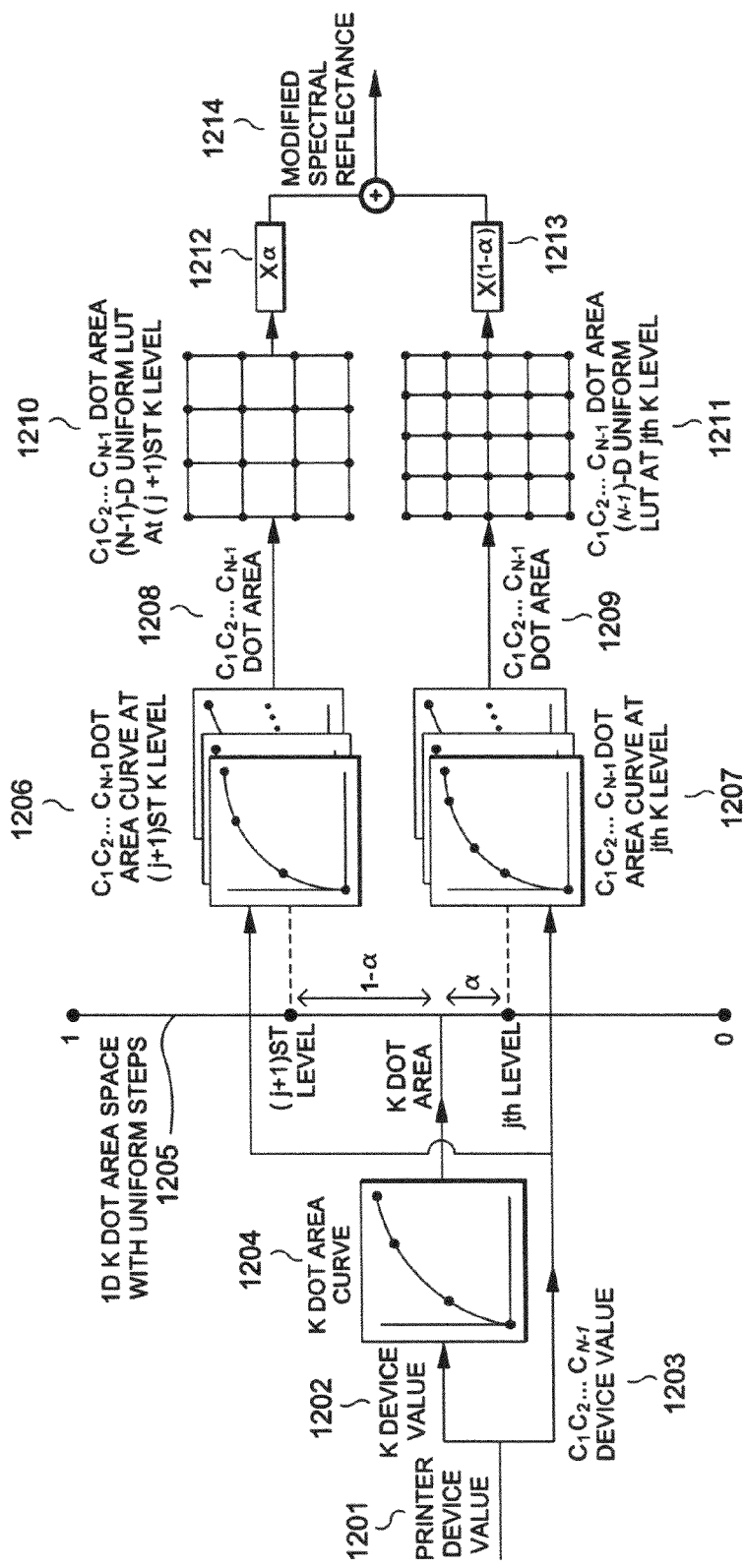
FIG. 12 is a view for explaining an overall computational architecture according to an exemplary embodiment of the present invention.

In FIG. 12, a spectral reflectance 1214 as predicted by the printer model is determined from a given printer device value 1201. More specifically, the input device value 1201 is separated into K device value 1202 and device value 1203 for the rest of the chromatic inks. The K device value 1202 is used to look up the K dot area using K dot area curve 1204. Then, sandwiching K dot area levels, namely ith level and (i+1)st level, are determined on 1D K dot area space with uniform steps 1205, along with relative distance ratio $\alpha$:1−$\alpha$ of the input K dot area between the sandwiching levels. On each K level, the $C_1 C_2 \ldots C_{N-1}$ device value 1203 is used to look up the $C_1 C_2 \ldots C_{N-1}$ dot areas 1208 and 1209 using the dot area curves 1206 and 1207, respectively, for that K level. The chromatic ink dot area values 1208 and 1209 are then fed into the (N−1)-D LUTs 1210 and 1211, corresponding to the two sandwiching K levels, for interpolation. The interpolation results from the two K levels are then linearly combined with weights $\alpha$ 1212 and 1−$\alpha$ 1213, respectively. This weighted sum 1214 is in the modified spectral reflectance space. A final call to the unmodifying transformation $\phi^{-1}$ (not shown) is made to obtain the model prediction of spectral reflectance.

In the above described computational model, it is assumed that all the LUTs have been fully populated. Ideally, each node of the LUTs corresponds to a printed sample that can be measured, and here lies the difficulty. Some of the nodes correspond to ink combinations with very high total ink coverage, which cannot be achieved in practice. Therefore, in this example embodiment, an algorithm will be outlined that supports an ink limit such that: (a) if a node has a total ink that is so far away from the ink limit that it will not affect the interpolation result of any ink combination within the ink limit, then the sample that corresponds to this node will not be printed at all; and (b) if a node has a total ink that is above the ink limit, but not so far off that its value will affect the interpolation result of some ink combinations that are within the ink limit, then this node needs to be populated with an appropriate value. Instead of printing the sample that corresponds to the ink combination for this node, a "replacement sample" with total ink within the ink limit is printed and measured. The measurement of this "replacement sample" is used to deduce the theoretical value of the node.

Suppose that a total ink limit L is imposed. It is assumed that $L \geq 1$, i.e., the substrate can at least sustain 100% ink coverage. This is an ink limit on the device space, i.e., all printable samples must have device values $C_1, C_2, \ldots, C_{N-1}$, K satisfying $$C_1 + C_2 + \ldots + C_{N-1} + K \leq L.$$

Now consider the ith K level $k_i$, and the $C_1 C_2 \ldots C_{N-1}$ LUT on this level. As previously discussed, this LUT has $m_i$ steps in each channel. Every printable node in this LUT must satisfy the ink limit $L - k_i$ for the chromatic inks. Since i is fixed for now, for the sake of brevity, $m = m_i$ and $l = L - k_i$. Since the inputs to the LUT are dot areas, it is necessary to translate this condition in terms of dot areas. In other words, if the dot area curves are $\rho_1(C_1), \rho_2(C_2), \ldots, \rho_{N-1}(C_{N-1})$, then the ink limit equation, in terms of the dot areas $a_1, a_2, \ldots, a_{N-1}$, is:

$$\rho_1^{-1}(a_1) + \rho_2^{-1}(a_2) + \ldots + \rho_{N-1}^{-1}(a_{N-1}) \leq l.$$

In general, the above inequality is nonlinear because of non-linearity of the dot area curves. On the other hand, they are assumed to be monotonic non-decreasing, which provides the desirable property that, if $a_i \leq a_i'$ for all i=1, 2, ..., N−1, then $$\rho_1^{-1}(a_1) + \rho_2^{-1}(a_2) + \ldots \rho_{N-1}^{-1}(a_{N-1}) \leq \rho_1^{-1}(a_1') + \rho_2^{-1}(a_2') + \ldots + \rho_{N-1}^{-1}(a_{N-1}').$$

This property is important for the concept of "Origin Node" which will be discussed in detail below.

The nodes of each $C_1 C_2 \ldots C_{N-1}$ LUT are examined to determine if the ink limit condition is satisfied. However, each of the nodes of a $C_1 C_2 \ldots C_{N-1}$ LUT is examined not by going through each node, but instead the cells of the LUT are traversed in a specific order and each node that belongs to the cell is examined. First, because there are m steps in each of the $C_1, C_2, \ldots, C_{N-1}$ channels, there are a total of $(m-1)^{N-1}$ cells, and each cell will have $2^{N-1}$ nodes associated with it. Out of these $2^{N-1}$ nodes, one node is designated to be the "Origin Node" of the cell. Namely, the Origin Node of a cell is the node with lowest total ink. Because the dot area curves $\rho_i$ are monotonic non-decreasing, and the LUT is uniformly spaced in the dot area space, this is equivalent to saying that the Origin Node is the node in that cell with lowest total index sum $$\sum_{j=1}^{N-1} i_j,$$

if the nodes are ordered lexicographically as $(i_1, i_2, \ldots, i_{N-1})$, where each $i_j$ is between 1 and m. If c is a cell, we denote its Origin Node by $\Omega(c)$. The order of traversing the cells is the non-decreasing order of the total ink of Origin Nodes. If two Origin Nodes have the same total ink, it does not matter which cell goes first.

Figure 13:
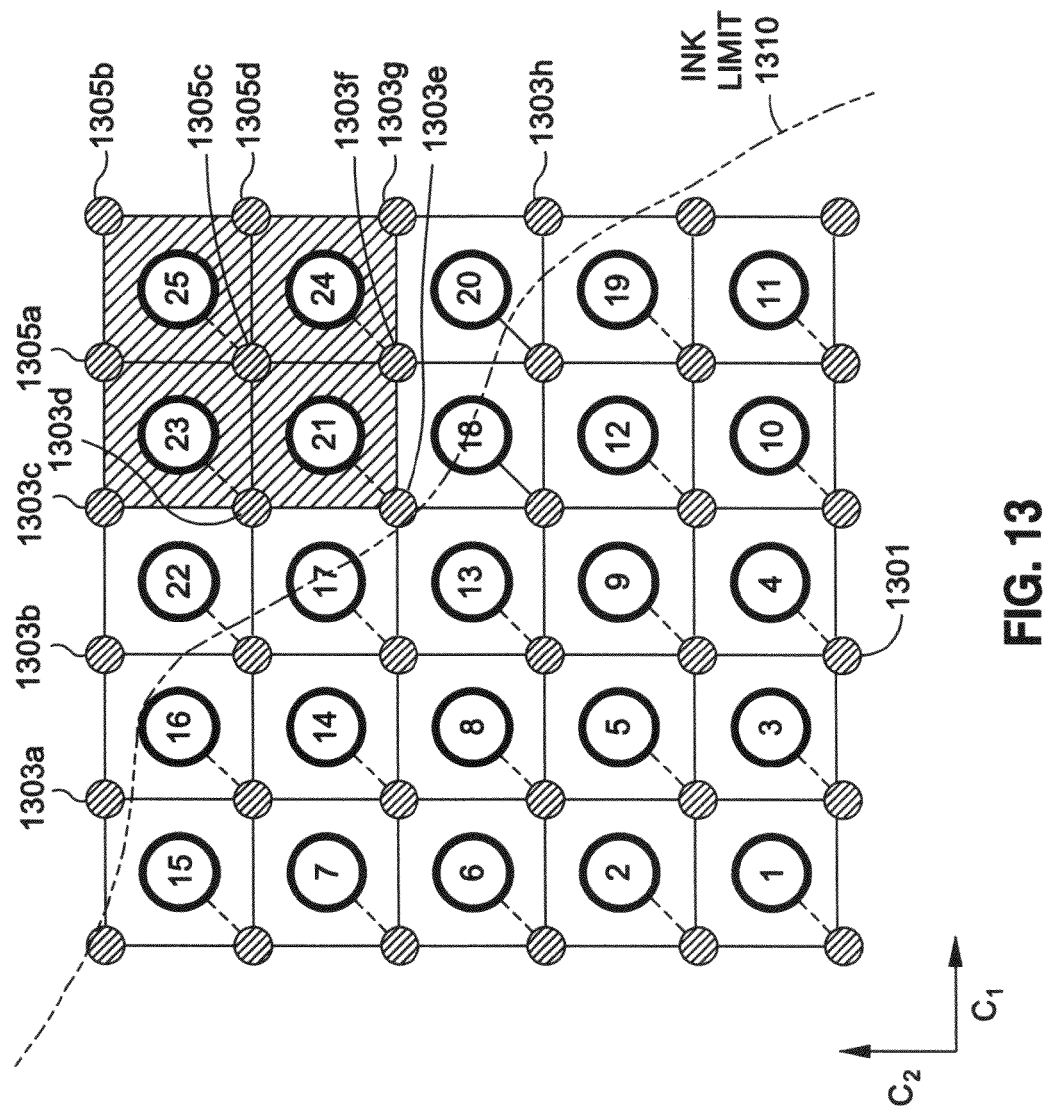
FIG. 13 is an example two-dimensional LUT to be populated using an exemplary embodiment of the present invention.

FIG. 13 illustrates the above described concepts on a 2D LUT with 2 inks. As shown in FIG. 13, the cells are numbered from 1 to 25 with thick lined circles according to the order they are traversed using the total ink of the Origin Nodes. The Origin Nodes are indicated by dotted lines that are connected to the numbered circles within the cells. For example, node 1301 is the Origin Node of cell 4. Also shown in FIG. 13 is a curved dashed line which represents ink limit 1310. Cells 21 and 23 to 25, which are shaded, are the only cells that are completely outside the ink limit 1310. However, this does not mean that the nodes of cells 21 and 23 to 25 do not matter in the printer model, because some of theses nodes, such as nodes 1303c to 1303g, are also shared by cells that lie partially inside the ink limit 1310. This is one of the reasons why the cells are traversed instead of the nodes. Nodes 1303a, 1303b and 1303h are outside the ink limit 1310, but belong to cells having an Origin Node inside the ink limit 1310. The nodes are examined in the light of their relationship to the cells, which bear a direct relationship to the ink limit 1310. As should be clear from FIG. 13, only nodes 1305a to 1305d are irrelevant in the printer model, i.e., they can be populated with any value without affecting the accuracy of the model.

Characterization Target Specification

In order to obtain the specification of the samples that will be printed on a particular K level $k_i$, the following algorithm is used and will be described in detail with regards to FIG. 14.

In step S1401, all of the nodes are labeled as "UNPROCESSED". The cells are then sorted in ascending order of total ink of their Origin Nodes (step S1402) and then traversed in this order. For each cell in the sorted list (S1403), a determination is made whether the Origin Node is within the ink limit (step S1404). If the Origin Node is outside the ink limit, the cell is skipped and the next cell is visited (step S1415). If the Origin Node is within the ink limit, then each node of the cell is examined.

For each UNPROCESSED node in the cell (S1405), a determination is made as to whether the UNPROCESSED node is within the ink limit (step S1406). If the node is within the ink limit, then the colorant values corresponding to the node are recorded (S1407), and the node is labeled "PROCESSED" (step S1408). If the node is outside the ink limit, then the node is skipped and the next UNPROCESSED node is visited (step S1409).

When all the nodes of the cell have been visited, a second pass is made in which each UNPROCESSED node of the cell is visited (S1410). A Sample Replacement algorithm, which will be described in detail below, is applied to each of the UNPROCESSED nodes (step S1411). The colorant values of the resulting replacement sample are recorded (S1412) and the node is labeled "PROCESSED" (step S1413). Then, the next UNPROCESSED node is visited (step S1414), and if all the UNPROCESSED nodes have been visited in the second pass, then the next cell in the sorted list is visited (step S1415). When all the cells in the sorted list have been visited, the process ends. The printable target specification is obtained as the set of all recorded colorant values.

It is noted that in steps S1405 to S1414, even if the Origin Node was labeled "UNPROCESSED", it will be re-labeled "PROCESSED" in the first pass. In other words, the Origin Node will not be "replaced" in these steps, because it is within the ink limit. However, a node that is the Origin Node of another cell (to be visited after the current cell) might be replaced in this step, but in that case, when that cell is traversed at a later time, the determination in step S1404 would go to step S1415, because the node is outside the ink limit.

Sample Replacement Algorithm

In step S1411 of FIG. 14, for an UNPROCESSED node, the colorant values of a sample is calculated that is within the ink limit using the following algorithm which will be described with reference to FIG. 15. The Origin Node of a cell, such as Origin Node 1501 of cell 1505, is assumed to be within the ink limit in step S1411 of FIG. 14, whereas an UNPROCESSED node, such as nodes 1502 to 1504, is necessarily outside the ink limit. It follows that a continuous path joining nodes 1502 to 1504 and Origin Node 1501 will intersect ink limit boundary 1510. A point of intersection at ink limit 1510, such as points 1506 to 1508, is taken to be the replacement sample for the UNPROCESSED node. More precisely, if the point of intersection is $(a_1^*, a_2^*, \ldots, a_{N-1}^*)$ in the dot area space, then the replacement sample to be printed has colorant values $(\rho_1^{-1}(a_1^*), \rho_2^{-1}(a_2^*), \ldots, \rho_{N-1}^{-1}(a_{N-1}^*))$.

Figure 16:
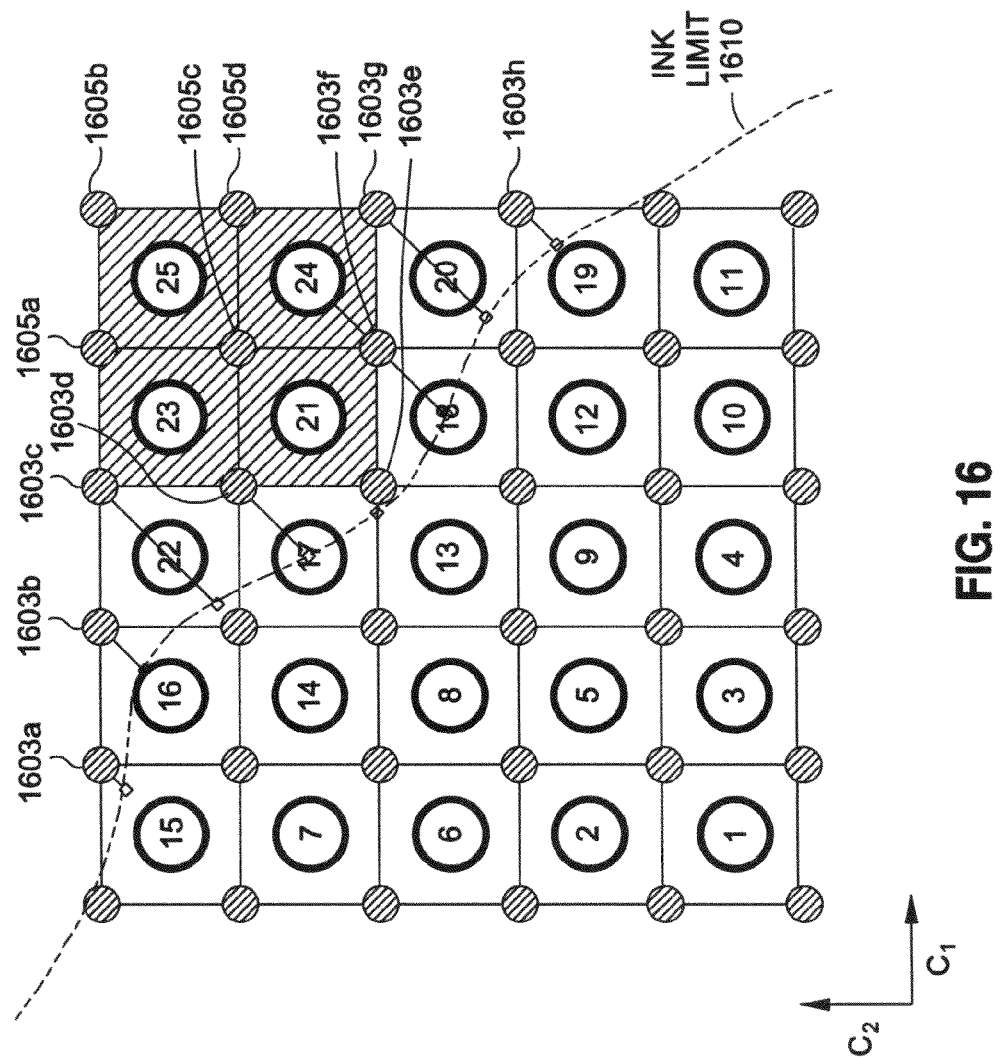
FIG. 16 is the example two-dimensional LUT of FIG. 13 after applying the Sample Replacement algorithm of FIG. 15.

FIG. 16 shows the results of running the Sample Replacement algorithm on the simple 2D example LUT depicted in FIG. 13. As shown in FIG. 16, nodes 1603a to 1603h were replaced with sample values at the intersection of paths from nodes 1603a to 1603h to their respective Origin Node, and the ink limit 1610. In addition, nodes 1605a to 1605d were not replaced using the Sample Replacement algorithm because they do not affect the accuracy of the printer model.

Figure 17:
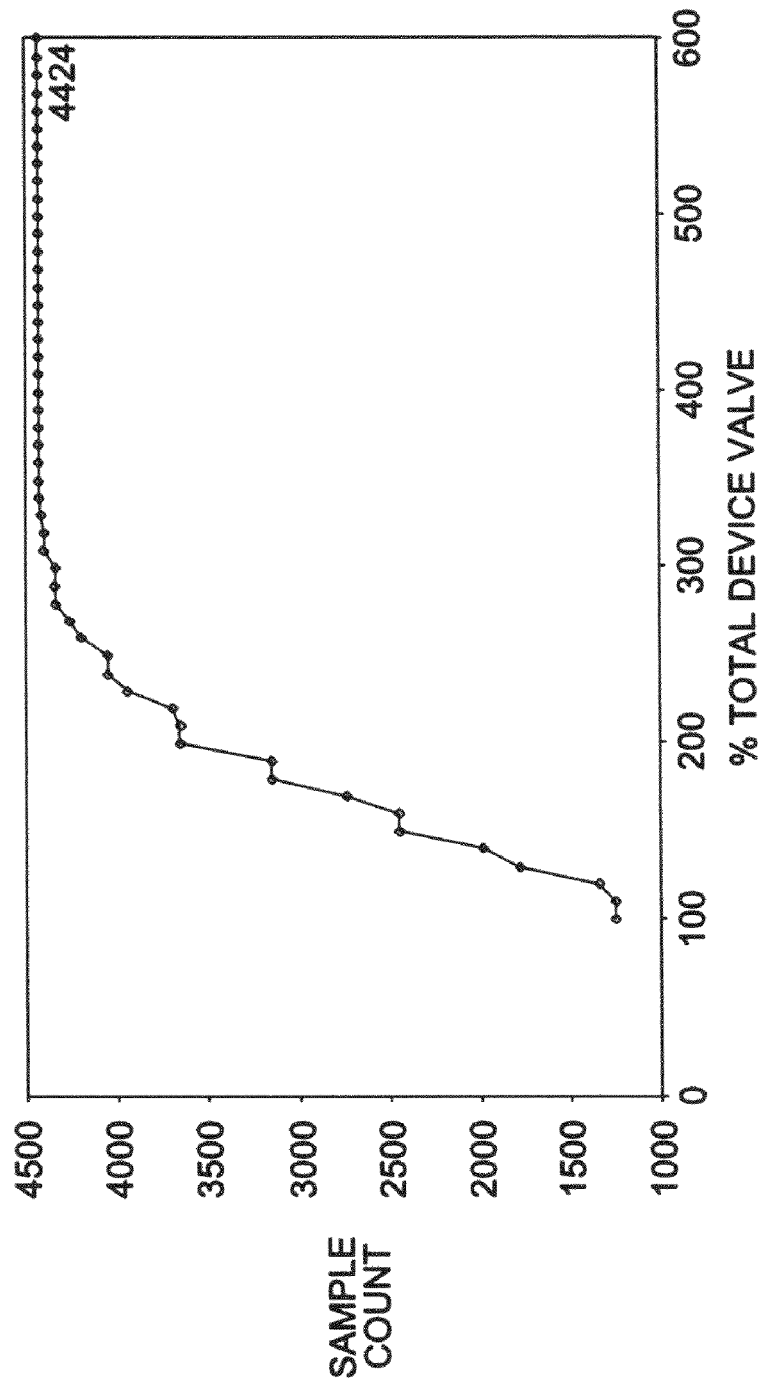
FIG. 17 shows a plot of total sample count against a total ink limit.

FIG. 17 shows a plot of total sample count against total ink limit for a typical run using the exemplary configuration ($m_K=4$, $m_1=5$, $m_2=4$, $m_3=3$, $m_4=2$). It is noted that the plot abuts to 4424 which is the total number of samples predicted earlier without any ink limiting. For a practical ink limit between 200% to 250%, the sample count ranges from 3650 to 4040, so the Sample Replacement algorithm further reduces the number of samples by a few hundred.

Populating the (N−1)-D LUT using the measurements will now be discussed. If a node is within the ink limit, then the (modified) spectral reflectance of the corresponding sample is simply populated into the LUT. However, when the node is outside the ink limit, a replacement sample has been printed instead, and an algorithm is used to deduce a value to be populated into the LUT at that node.

LUT Populating Algorithm

In the example embodiment, a LUT Populating algorithm is used to populate an (N−1)-D LUT and will be described with reference to FIG. 18. The LUT Populating algorithm closely parallels the Sample Replacement Algorithm as described above with reference to FIG. 14. For the LUT at K level $k_i$, the LUT will be populated by traversing the cells in the same order as in the construction of the characterization target.

More specifically, in step S1801, all nodes are labeled as "UNPROCESSED". Next, the cells are sorted in ascending order of total ink of their Origin Nodes (step S1802), and then the cells are traversed in this order. For each cell in the sorted list (S1803), a determination is made as to whether the Origin Node of the cell is within the ink limit (step S1804). If the Origin Node is outside the ink limit, then the cell is skipped and the next cell in the sorted list is visited (step S1812). If the Origin Node is within the ink limit, then each node of the cell is examined (step S1805). For each UNPROCESSED node in the cell (S1805), a determination is made as to whether the UNPROCESSED node is within the ink limit (step S1806). If the node is labeled "UNPROCESSED" and is within the ink limit, then the node is populated with (modified) measured data, and then labeled "PROCESSED" (step S1807). Then, the next UNPROCESSED node is visited.

If the node is outside the ink limit in step S1806, then the node is skipped and left labeled as "UNPROCESSED", and the next node is visited (step 1808). After all the nodes of the cell have been visited, a determination is made as to whether there are any UNPROCESSED nodes remaining (step S1809). If there are no UNPROCESSED nodes remaining, then the next cell in the sorted list is visited (step S1812).

If the there are UNPROCESSED nodes, then each node has been associated with a replacement sample, and a Node Fitting algorithm, which will be described in detail below, is applied to the UNPROCESSED nodes to calculate their values (step S1810). The UNPROCESSED nodes are then populated with their calculated values, and are then labeled "PROCESSED" (step S1811). Then, the next cell in the sorted list is visited (step S1812). If all the cells of the sorted list have been visited, the process ends.

In step S1804, if the Origin Node is outside the ink limit, then the whole cell is outside the ink limit. In that case, the printer model need not be defined at all for that cell. Accordingly, there is no need to populate any node that has not already been PROCESSED. On the other hand, it might be desirable to populate the nodes anyway. For example, if the LUT resides in the memory space of a program, it is not desirable to leave it with random bits. In that case, and for the reason that the printer model does not need to be defined in this cell, the UNPROCESSED nodes can be populated with the most economical method, for example, populating the nodes with a predetermined value. Alternatively, a more sophisticated method could be used which copies the values from the Origin Node, which must have already been populated by the logic of the algorithm.

Node Fitting Algorithm

Figure 18:
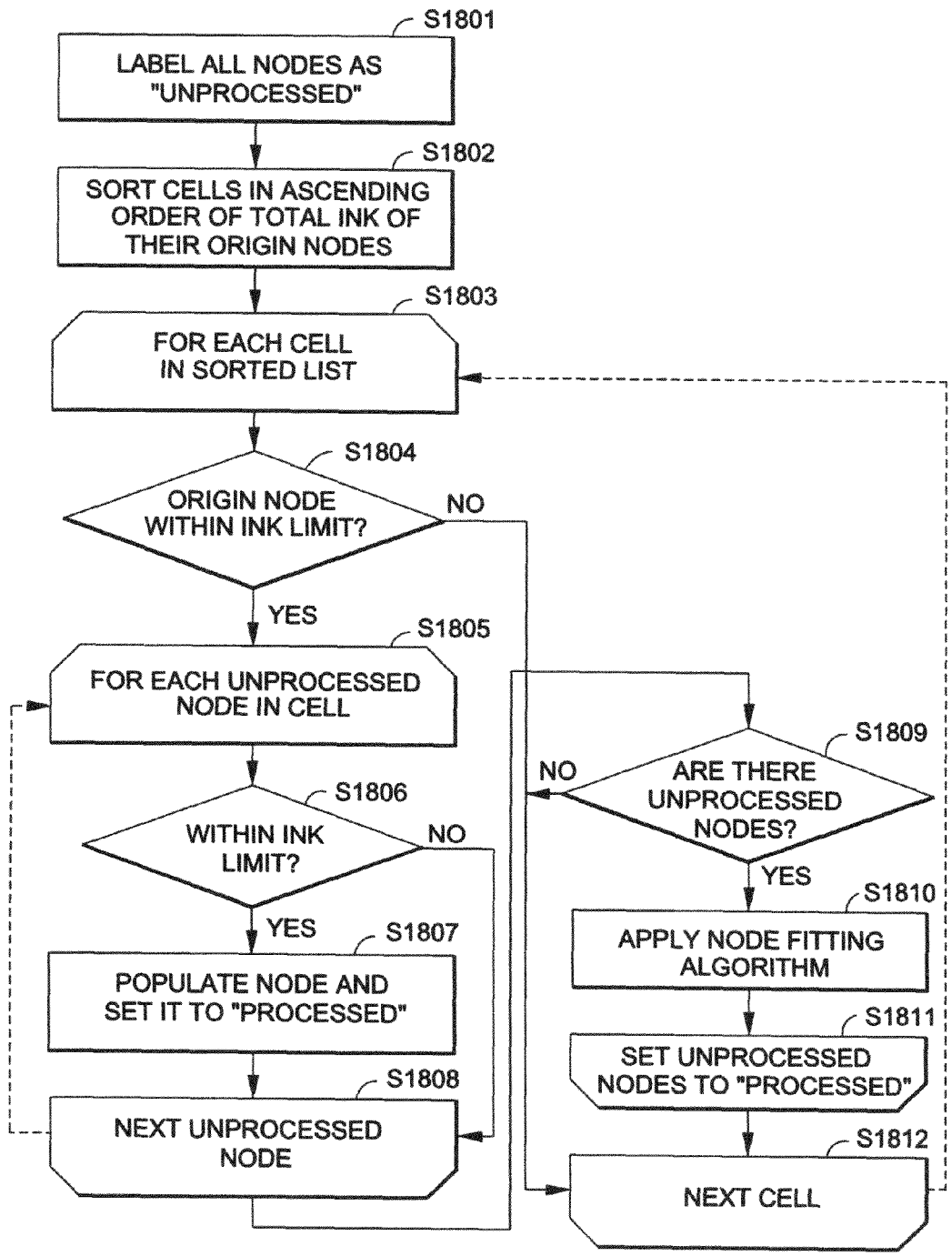
FIG. 18 is a flowchart for explaining a LUT populating algorithm in accordance with an exemplary embodiment of the present invention.

In steps S1804 to S1811 of FIG. 18, the nodes of the cell are either labeled "PROCESSED" or "UNPROCESSED". If a node is labeled "PROCESSED", it is already populated with an output value (the "modified" measured spectral reflectance). Incidentally, the node is also associated with an input value, namely the dot areas, which is simply the location of the node in the LUT. If a node is labeled "UNPROCESSED", it doesn't have an output value yet, but it is known that it has an associated replacement sample and measurement, and the replacement sample has dot areas as well. To summarize, there exists $2^{N-1}$ pairs of data, each consisting of dot areas and (modified) spectral reflectance either from measurement or from a previous application of the Node Fitting Algorithm in a previously traversed cell. The "relative dot areas" with the cell, which lie in the range [0,1], will be used. In other words, if the upper and lower bounds for the dot areas for the cell are $a_i^U$ and $a_i^L$ respectively for i=1, 2, ..., N-1, then the relative dot areas $\alpha=(\alpha_1, \alpha_2, \ldots, \alpha_{N-1})$ for dot areas $a=(a_1, a_2, \ldots, a_{N-1})$ are:

$$\alpha_i = (a_i - a_i^L)/(a_i^U - a_i^L).$$

An interpolation algorithm within this cell typically assigns weights to each node and the interpolation result is a weighted sum of the output values at the nodes. The weights are functions of the relative dot areas and the node:

$$w_{node} = w_{node}(\alpha)$$

$$\sum_{All\ Nodes\ In\ Cell} w_{node} = 1$$

where the $2^{N-1}$ pairs of data are ordered in some fashion. For example, for the multilinear interpolation (which corresponds to the Demichel equations), $$w_{(i_1, i_2, \ldots, i_{N-1})}^{Demichel}(\alpha_1, \alpha_2, \ldots, \alpha_{N-1}) = \left\{ \begin{array}{ll} \alpha_1 & if\ i_1 = 1 \\ 1 - \alpha_1 & if\ i_1 = 0 \end{array} \right\} \times \ldots \times \left\{ \begin{array}{ll} \alpha_{N-1} & if\ i_{N-1} = 1 \\ 1 - \alpha_{N-1} & if\ i_{N-1} = 0 \end{array} \right\}.$$

For concreteness, it is assumed in the following that the nodes are ordered so that the first r nodes are the UNPROCESSED nodes, and the remaining $2^{N-1}-r$ are PROCESSED. The $2^{N-1}$ pairs of data are, ordered correspondingly, $\alpha_1$, $\alpha_2, \ldots, \alpha_{2^{N-1}}$ and $R_1, R_2, \ldots, R_{2^{N-1}}$. The first r $\alpha$'s correspond to the relative dot areas for the replacement samples, whereas the remaining $\alpha$'s correspond to the PROCESSED nodes. Similarly, the first r R's correspond to the measured ($\phi$-modified) spectral reflectances of the replacement samples, whereas the remaining R's correspond to the already populated values at the PROCESSED nodes. Now, the system of linear equations for $S_1, S_2, \ldots, S_{2^{N-1}}$ is solved as follows:

$$w_1(\alpha_1)S_1 + \ldots + w_{2^{N-1}}(\alpha_1)S_{2^{N-1}} = R_1$$
$$w_1(\alpha_2)S_1 + \ldots + w_{2^{N-1}}(\alpha_2)S_{2^{N-1}} = R_2$$
$$\vdots$$
$$w_1(\alpha_{2^{N-1}})S_1 + \ldots + w_{2^{N-1}}(\alpha_{2^{N-1}})S_{2^{N-1}} = R_{2^{N-1}}$$

Then, the sought for output values for the r UNPROCESSED nodes are given by $S_1, S_2, \ldots, S_r$. It is clear that since $w_i(\alpha_j) = \delta_{ij}$ (Kronecker delta) for j>r, $S_j = R_j$, i.e., the equations do not give new values for the already PROCESSED nodes.

An advantage of the above described Node Fitting algorithm is that it is designed to be compatible with the underlying interpolation algorithm, and has the interpolation weights built in. Another advantage of the algorithm is that it fits all missing nodes in a cell simultaneously. Other 1D extrapolation techniques are not going to be able to handle a situation in which a cell has 2 missing nodes consistently, without worrying about issues such as which missing node should be extrapolated first.

The invention has been described above with respect to particular illustrative embodiments. It is understood that the invention is not limited to the above-described embodiments and that various changes and modifications may be made by those skilled in the relevant art without departing from the spirit and scope of the invention.

What is claimed is:

1. A method for determining colorant values for color patches in a printable target that contains plural such color patches, wherein the printable target is printable by a color printer having multiple colorant channels including a black channel and multiple non-black channels, and wherein the printable target is thereafter usable for color characterization of the color printer, wherein the method comprises:

printing a black ramp using the black channel;

measuring color values of the black ramp to obtain measured color values thereof;

selecting substantially uniform steps on the black ramp as determined in a printer independent color space, by applying principal component analysis (PCA) to the measured color values or color values derived from the measured color values of the black ramp, and by using a first principal component from PCA thereof to select the substantially uniform steps, wherein the substantially uniform steps are substantially invariant to small variations in the first principal component of the measured color values on the black ramp;

performing, for multiple ones of the substantially uniform steps on the black ramp, the following steps (a) through (c) of:

(a) printing a chromatic ramp using each of the multiple non-black colorant channels along with the black channel at a corresponding black level of the one of the substantially uniform steps on the black ramp;

(b) measuring color values of the chromatic ramps to obtain measured color values thereof;

(c) selecting substantially uniform steps on each of the chromatic ramps as determined in a printer independent color space, by applying principal component analysis (PCA) to the measured color values or color values derived from the measured color values of each such chromatic ramp, and by using a first principal component from PCA thereof to select the substantially uniform steps, wherein the substantially uniform steps are substantially invariant to small variations in the first principal component of each such chromatic ramp, and wherein there are a greater number of substantially uniform steps on each such chromatic ramp at smaller values of the black level than number of substantially uniform steps on each such chromatic ramp at larger values of the black level; and populating colorant values of the color patches in the printable target by using multiple combinations on the substantially uniform steps on the black ramp and on the chromatic ramps that meet an ink limiting threshold.

2. A method for determining colorant values for color patches in a printable target according to claim 1, wherein the method further comprises:

defining a cellular dot area model for each printed and measured black or chromatic ramp, wherein each cellular dot area model maps arbitrary colorant values of each ramp to corresponding dot areas of such colorant values; and determining a replacement colorant combination for one of the multiple combinations of the substantially uniform steps on the black ramp and on the chromatic ramps at the corresponding black levels that does not meet the ink limiting threshold, wherein the replacement colorant combination is determined by using an inverse of the cellular dot area model, and wherein the replacement colorant combination is populated into a corresponding color patch in the printable target.

3. A method for determining colorant values for color patches in a printable target according to claim 2, wherein no more than one replacement colorant combination is determined for each combination of the substantially uniform steps that does not meet the ink limiting threshold.

4. A method for determining colorant values for color patches in a printable target according to claim 2, wherein said step of determining a replacement colorant combination comprises:

determining a current step of the substantially uniform steps on each chromatic ramp such that the current steps correspond to the colorant combination to be replaced;

determining a colorant combination formed by reducing a current step of the substantially uniform steps of a chromatic ramp to a previous step, while maintaining the black ink at the same black level;

verifying that the resulting colorant combination satisfies the ink limiting threshold;

constructing a path in a dot area space connecting a dot area combination corresponding to the resulting colorant combination to a dot area combination corresponding to the colorant combination to be replaced;

determining a dot area combination on the path that has a maximum total ink and satisfies the ink limiting threshold; and obtaining the replacement colorant combination by converting the dot area combination to colorant combination using an inverse of the cellular dot area model.

5. A method for determining colorant values for color patches in a printable target according to claim 2, wherein the cellular dot area model for each ramp is constructed by applying a Yule-Nielsen model to each interval (cell) between the substantially uniform steps on each ramp.

6. A method for determining colorant values for color patches in a printable target according to claim 1, wherein said step of performing the printing, measuring and selecting substantially uniform steps on each of the chromatic ramps for multiple ones of the substantially uniform steps on the black ramp is performed for all of the substantially uniform steps on the black ramp except the substantially uniform step that corresponds to a full black value.

7. A method for determining colorant values for color patches in a printable target according to claim 1, wherein said step of selecting substantially uniform steps on the black ramp or a chromatic ramp (hereafter referred to as "the ramp") comprises:

designating M measured color values of the ramp wherein M is the number of steps of the ramp;

applying PCA to the M measured color values or color values derived from the measured color values to obtain first principal component values thereof;

normalizing the first principal component values to take values between zero and one;

designating a number m of substantially uniform steps, wherein m<M; and selecting an i-th step for the substantially uniform steps from the M steps of the ramp, wherein the selected step has a corresponding normalized first principal component value closest to the value of i divided by (m−1) and i ranges from zero to m−1.

8. A method for determining colorant values for color patches in a printable target according to claim 1, wherein the step of measuring color values of the black ramp or a chromatic ramp comprises the step of measuring colorimetric values.

9. A method for determining colorant values for color patches in a printable target according to claim 1, wherein the step of measuring color values of the black ramp or a chromatic ramp comprises the step of measuring spectral reflectance values.

10. A method for color characterization of a color printer having multiple colorant channels including a black channel, the method using a set of dot area curves, one for each colorant channel, and a multi-dimensional LUT with a same number of input dot area channels as the number of colorant channels, comprising the steps of:

printing a printable target by the printer, wherein the printable target contains plural color patches each having colorant values corresponding to the multiple colorant channels of the printer, and wherein colorant values for the color patches in the printable target are determined according to a method of claim 1;

measuring the printed color patches to obtain a measured color value for each color patch;

converting the colorant values to colorant dot areas using the set of dot area curves; and populating a LUT that relates the colorant dot areas to colorimetric or spectral reflectance values, wherein each LUT entry is associated with a colorimetric or spectral reflectance value corresponding to a colorant dot area combination of the LUT entry, wherein the colorimetric or spectral reflectance values are obtained either (a) by using the measured color value of a color patch corresponding to a LUT entry, if the ink limit threshold is met for the LUT entry, or (b) by a method of extrapolation using the measured color values of color patches in the vicinity of a LUT entry including a color patch corresponding to a replacement colorant combination, if the ink limit threshold is not met for the LUT entry.

11. A device driver for a multi-channel printer comprising: a LUT constructed according to the method of claim 10.

12. A non-transitory computer-readable medium on which is stored computer-executable process steps, the computer-executable process steps for determining colorant values for color patches in a printable target that contains plural such color patches, wherein the printable target is printable by a color printer having multiple colorant channels including a black channel, and wherein the printable target is thereafter usable for color characterization of the color printer, said computer-executable process steps comprising process steps executable to perform a method according to any of claims 1 to 9.

13. A non-transitory computer-readable medium on which is stored computer-executable process steps, the computer-executable process steps for color characterization of a color printer having multiple colorant channels including a black channel, the method using a set of dot area curves, one for each colorant channel, and a multi-dimensional LUT with a same number of input dot area channels as the number of colorant channels, said computer-executable process steps comprising process steps executable to perform a method according to claim 10.

14. An apparatus for determining colorant values for color patches in a printable target that contains plural such color patches, wherein the printable target is printable by a color printer having multiple colorant channels including a black channel and multiple non-black channels, and wherein the printable target is thereafter usable for color characterization of the color printer, wherein the apparatus comprises:

a printing unit constructed to print a black ramp using the black channel;

a measuring unit constructed to measure color values of the black ramp to obtain measured values thereof;

a selecting unit constructed to select substantially uniform steps on the black ramp as determined in a printer independent color space, by applying principal component analysis (PCA) to the measured color values or color values derived from the measured color values of the black ramp, and by using a first principal component from PCA thereof to select the substantially uniform steps, wherein the substantially uniform steps are substantially invariant to small variations in the first principal component of the measured color values on the black ramp, wherein, for multiple ones of the substantially uniform steps on the black ramp:

said printing unit is constructed to print a chromatic ramp using each of the multiple non-black colorant channels along with the black channel at a corresponding black level of the one of the substantially uniform steps on the black ramp;

said measuring unit is constructed to measure color values of the chromatic ramps to obtain measured color values thereof; and said selecting unit is constructed to select substantially uniform steps on each of the chromatic ramps as determined in a printer independent color space, by applying principal component analysis (PCA) to the measured color values or color values derived from the measured color values of each such chromatic ramp, and by using a first principal component from PCA thereof to select the substantially uniform steps, wherein the substantially uniform steps are substantially invariant to small variations in the first principal component of each such chromatic ramp, and wherein there are a greater number of substantially uniform steps on each such chromatic ramp at smaller values of the black level than number of substantially uniform steps on each such chromatic ramp at larger values of the black level; and a populating unit constructed to populate colorant values of the color patches in the printable target by using multiple combinations on the substantially uniform steps on the black ramp and on the chromatic ramps that meet an ink limiting threshold.

15. An apparatus for determining colorant values for color patches in a printable target according to claim 14, wherein the apparatus further comprises:

a defining unit constructed to define a cellular dot area model for each printed and measured black or chromatic ramp, wherein each cellular dot area model maps arbitrary colorant values of each ramp to corresponding dot areas of such colorant values; and a determining unit constructed to determine a replacement colorant combination for one of the multiple combinations of the substantially uniform steps on the black ramp and on the chromatic ramps at the corresponding black levels that does not meet the ink limiting threshold, wherein the replacement colorant combination is determined by using an inverse of the cellular dot area model, and wherein the replacement colorant combination is populated into a corresponding color patch in the printable target.

16. An apparatus for determining colorant values for color patches in a printable target according to claim 15, wherein no more than one replacement colorant combination is determined for each combination of the substantially uniform steps that does not meet the ink limiting threshold.

17. An apparatus for determining colorant values for color patches in a printable target according to claim 15, wherein said determining unit is constructed to determine a current step of the substantially uniform steps on each chromatic ramp such that the current steps correspond to the colorant combination to be replaced; to determine a colorant combination formed by reducing a current step of the substantially uniform steps of a chromatic ramp to a previous step, while maintaining the black ink at the same black level; to verify that the resulting colorant combination satisfies the ink limiting threshold; to construct a path in a dot area space connecting a dot area combination corresponding to the resulting colorant combination to a dot area combination corresponding to the colorant combination to be replaced; to determine a dot area combination on the path that has a maximum total ink and satisfies the ink limiting threshold; and to obtain the replacement colorant combination by converting the dot area combination to colorant combination using an inverse of the cellular dot area model.

18. An apparatus for determining colorant values for color patches in a printable target according to claim 15, wherein the cellular dot area model for each ramp is constructed by applying a Yule-Nielsen model to each interval (cell) between the substantially uniform steps on the ramp.

19. An apparatus for determining colorant values for color patches in a printable target according to claim 14, wherein said selecting unit is constructed to designate M measured color values of the ramp wherein M is the number of steps of the ramp; to apply PCA to the M measured color values or color values derived from the measured color values and each chromatic ramp to obtain first principal component values thereof; to normalize the first principal component values to take values between zero and one; to designate a number m of substantially uniform steps, wherein m<M; and to select an i-th step for the substantially uniform steps from the M steps of the ramp, wherein the selected step has a corresponding normalized first principal component value closest to the value of i divided by (m−1) and i ranges from zero to m−1.

20. An apparatus for determining colorant values for color patches in a printable target according to claim 14, wherein the measuring unit is constructed to measure colorimetric values.

21. An apparatus for determining colorant values for color patches in a printable target according to claim 14, wherein the measuring unit is constructed to measure spectral reflectance values.

* * * * *